US011654655B2

(12) United States Patent
Fuke et al.

(10) Patent No.: US 11,654,655 B2
(45) Date of Patent: May 23, 2023

(54) REINFORCEMENT SHEET, REINFORCEMENT MEMBER, REINFORCEMENT KIT, PRODUCING METHOD OF REINFORCEMENT SHEET, AND PRODUCING METHOD OF REINFORCEMENT MEMBER

(71) Applicant: NITTO DENKO CORPORATION, Osaka (JP)

(72) Inventors: Kazuhiro Fuke, Osaka (JP); Masatsugu Koso, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 16/649,827

(22) PCT Filed: Sep. 28, 2018

(86) PCT No.: PCT/JP2018/036422
§ 371 (c)(1),
(2) Date: Mar. 23, 2020

(87) PCT Pub. No.: WO2019/066022
PCT Pub. Date: Apr. 4, 2019

(65) Prior Publication Data
US 2020/0282704 A1    Sep. 10, 2020

(30) Foreign Application Priority Data

Sep. 29, 2017  (JP) .............................. JP2017-191287

(51) Int. Cl.
*B32B 15/14*  (2006.01)
*B32B 5/02*  (2006.01)
(Continued)

(52) U.S. Cl.
CPC ............... *B32B 15/14* (2013.01); *B32B 5/02* (2013.01); *B32B 5/022* (2013.01); *B32B 5/12* (2013.01);
(Continued)

(58) Field of Classification Search
CPC ........... B32B 15/14; B32B 5/022; B32B 5/12; B32B 15/092; B32B 5/02; B32B 5/26;
(Continued)

(56) References Cited

U.S. PATENT DOCUMENTS

2010/0098910 A1   4/2010   Naritomi et al.
2010/0159196 A1   6/2010   Naritomi et al.

FOREIGN PATENT DOCUMENTS

JP   H02-169658 A   6/1990
JP   H07-124981 A   5/1995
(Continued)

OTHER PUBLICATIONS

Machine Translation of JP 2005-161852 A. (Year: 2005).*
(Continued)

*Primary Examiner* — Brian Handville
(74) *Attorney, Agent, or Firm* — Edwards Neils LLC; Jean C. Edwards, Esq.

(57) ABSTRACT

A reinforcement sheet for reinforcing a metal plate by adhering to the metal plate includes a core material layer containing a resin and a front layer disposed at one side in a thickness direction of the core material layer. The front layer is obtained by laminating a plurality of unidirectional fiber resin composite sheets, and an area ratio of a void in a cross section of a solidified material of the core material layer is 50% or less.

10 Claims, 10 Drawing Sheets

(51) Int. Cl.
    *B32B 5/26*     (2006.01)
    *B32B 7/12*     (2006.01)
    *B32B 27/20*     (2006.01)
    *B32B 27/38*     (2006.01)
    *B32B 5/12*     (2006.01)
    *B32B 15/092*     (2006.01)

(52) U.S. Cl.
    CPC .................. *B32B 5/26* (2013.01); *B32B 7/12* (2013.01); *B32B 15/092* (2013.01); *B32B 27/20* (2013.01); *B32B 27/38* (2013.01); *B32B 2260/023* (2013.01); *B32B 2260/046* (2013.01); *B32B 2262/101* (2013.01); *B32B 2262/106* (2013.01); *B32B 2264/102* (2013.01)

(58) Field of Classification Search
    CPC ........... B32B 7/12; B32B 27/20; B32B 27/38; B32B 2264/102; B32B 2260/023; B32B 2260/046; B32B 2262/101; B32B 2262/106; B32B 7/02; B32B 15/08; B32B 27/04
    See application file for complete search history.

(56) References Cited

FOREIGN PATENT DOCUMENTS

| | | |
|---|---|---|
| JP | 2005-161852 A | 6/2005 |
| JP | 2010-058394 A | 3/2010 |
| JP | 2012-082394 A | 4/2012 |
| WO | 2008/114669 A | 9/2008 |
| WO | 2008/126812 A1 | 10/2008 |

OTHER PUBLICATIONS

Machine Translation of JP 2012-082394 A. (Year: 2012).*
International Search Report Issued in PCT/JP2018/036422 dated Nov. 27, 2018.
Written Opinion Issued in PCT/JP2018/036422 dated Nov. 27, 2018.
International Search Report Issued in PCT/JP2018/036423 dated Nov. 27, 2018.
Written Opinion Issued in PCT/JP2018/036423 dated Nov. 27, 2018.
Office Action, issued by the European Patent Office dated May 27, 2021, in connection with European Patent Application No. 18863465.3.
Office Action, issued by the European Patent Office dated Jun. 24, 2021, in connection with corresponding European Patent Application No. 18863464.6.
Office Action, which was issued by the State Intellectual Property Office dated Sep. 9, 2021, in connection with corresponding Chinese Patent Application No. 201880063425.3.
Failure Analysis, ed. Ho Yuhuai, pp. 208-209, National Defense Industry Press, Mar. 2017, Beijing.
Office Action, which was issued by the State Intellectual Property Office dated Sep. 8, 2021, in connection with corresponding Chinese Patent Application No. 201880063337.3.
Office Action, issued in connection with U.S. Appl. No. 16/649,828 dated Oct. 21, 2021.
Office Action, which was issued by the State Intellectual Property Office dated Mar. 8, 2022, in connection with Chinese Patent Application No. 201880063337.3.
Office Action, issued by the Japanese Patent Office Office dated Dec. 27, 2022, in connection with Japanese Patent Application No. 2019-545167.
Non-Final Office Action dated Sep. 6, 2022, in connection with U.S. Appl. No. 16/649,828.
Office Action, issued by the State Intellectual Property Office dated Jul. 13, 2022, in connection with Chinese Patent Application No. 201880063337.3.
Office Action, issued by the Japanese Patent Office Office dated Aug. 30, 2022, in connection with Japanese Patent Application No. 2019-545167.
Office Action, issued by the Japanese Patent Office Office dated Aug. 30, 2022, in connection with Japanese Patent Application No. 2019-545167.
Office Action, issued by the Japanese Patent Office Office dated Feb. 7, 2023, in connection with Japanese Patent Application No. 2019-545168.

* cited by examiner

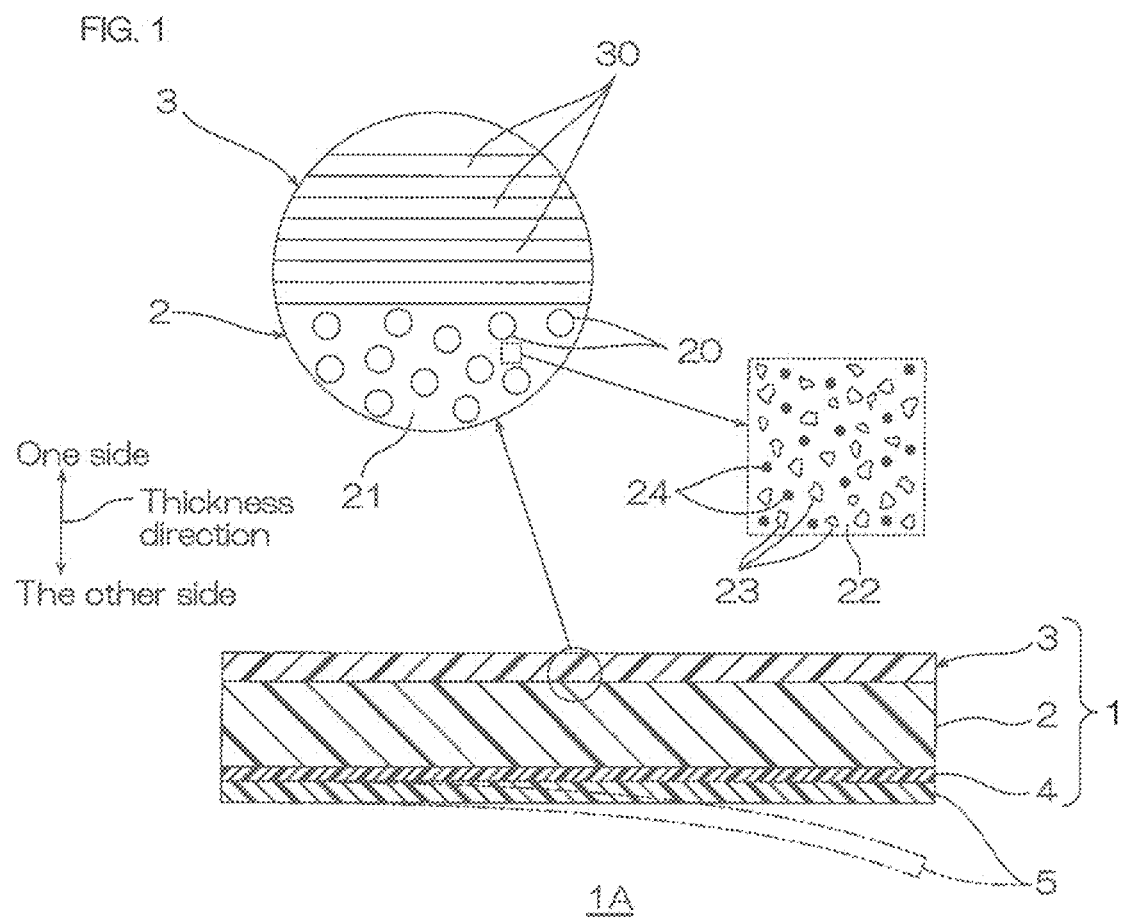

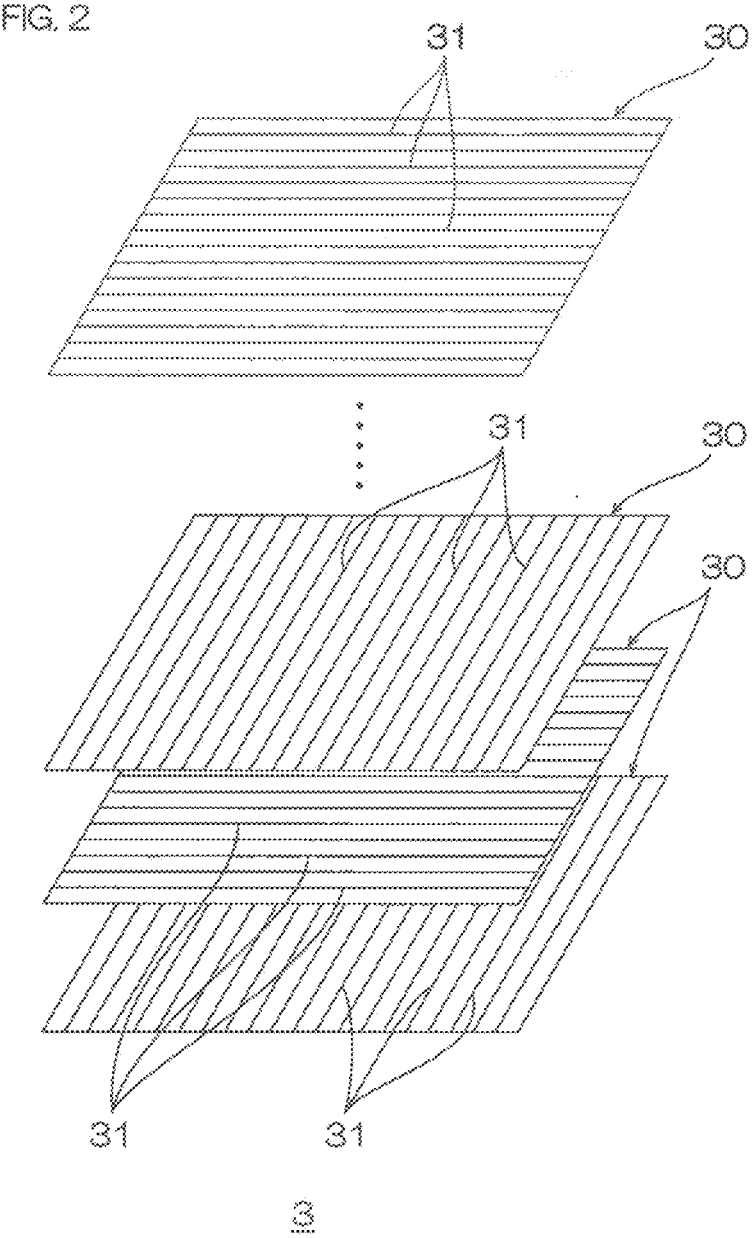

REINFORCEMENT SHEET, REINFORCEMENT MEMBER, REINFORCEMENT KIT, PRODUCING METHOD OF REINFORCEMENT SHEET, AND PRODUCING METHOD OF REINFORCEMENT MEMBER

CROSS-REFERENCE TO RELATED APPLICATIONS

The present application is a 35 U.S.C. 371 National Stage Entry of PCT/JP2018/036422, filed on Sep. 28, 2018, which claims priority from Japanese Patent Application No. 2017-191287, filed on Sep. 29, 2017, the contents of all of which are herein incorporated by reference in their entirety.

TECHNICAL FIELD

The present invention relates to a reinforcement sheet, a reinforcement member, a reinforcement kit, a method for producing a reinforcement sheet, and a method for producing a reinforcement member.

BACKGROUND ART

It has been conventionally known that a metal plate used for various industrial products is reinforced by a reinforcement sheet.

As such a reinforcement, sheet, for example, a steel plate reinforcement sheet including glass cloth and a thermosetting resin layer that is laminated on the glass cloth has been proposed (ref: for example, Patent Document 1).

In the reinforcement sheet, the thermosetting resin layer is attached to a steel plate, and thereafter, the thermosetting resin layer is cured by healing, so that the steel plate is reinforced.

CITATION LIST

Patent Document

Patent Document 1: Japanese Unexamined Patent Publication No. 2010-58394

SUMMARY OF THE INVENTION

Problem to be Solved by the Invention

Meanwhile, a reduction in thickness of the metal plate used for various industrial products has been recently required. In transportation machines such as automobiles, in particular, it has been required to achieve a reduction in thickness of the metal plate, and a weight reduction of the transportation machine in order to reduce an amount of emission of carbon dioxide.

However, when the metal plate achieves a reduction in thickness, the strength thereof may be insufficient. Then, it is considered that the metal plate is reinforced by using the steel plate reinforcement sheet described in Patent Document 1. In various industrial products such as transportation machines, further improvement of reinforcement properties of the steel plate reinforcement sheet, described in Patent Document 1 with respect to the metal plate may be demanded.

The present invention provides a reinforcement sheet that is capable of achieving improvement of reinforcement properties with respect to a metal plate, a reinforcement member, a reinforcement kit, a method for producing a reinforcement sheet, and a method for producing a reinforcement member.

Means for Solving the Problem

The present invention [1] includes a reinforcement sheet for reinforcing a metal plate by adhering to the metal plate including a core material layer containing a resin and a front layer disposed at one side in a thickness direction of the core material layer, wherein the front layer is obtained by laminating a plurality of unidirectional fiber resin composite sheets, and an area ratio of a void in a cross section of a solidified material of the core material layer is 50% or less.

The present invention [2] includes the reinforcement sheet described in the above-described [1], wherein the core material layer further contains a filler, and a content ratio of the filler in the core material layer is 15 mass % or more and below 85 mass %.

The present invention [3] includes the reinforcement sheet described in the above-described [1] or [2], wherein the resin contains a matrix resin and an elastomer forming a two-phase structure dispersed in the matrix resin, and an area ratio of a domain consisting of the elastomer in the cross section of the solidified material of the core material layer is 40% or less.

The present invention [4] includes the reinforcement sheet described in the above-described [1] or [2], wherein the resin contains a matrix resin and an elastomer forming a two-phase structure dispersed in the matrix resin, and an area ratio of a domain consisting of the elastomer in the cross section of the solidified material of the core material layer is 30% or less.

The present invention [5] includes the reinforcement sheet described in the above-described [3] or [4] wherein the number of the domain per 10624 $\mu m^2$ of the cross-sectional area of the solidified material of the core material layer is 5 or more.

The present invention [6] includes the reinforcement sheet described in the above-described [3] or [4], wherein the number of the domain per 26.56 $\mu m^2$ of the cross-sectional area of the solidified material of the core material layer is 5 or more.

The present invention [7] includes the reinforcement sheet described in any one of the above-described [3] to [6], wherein the matrix resin contains an unmodified epoxy resin and the elastomer contains a rubber-modified epoxy resin.

The present invention [8] includes the reinforcement sheet described in any one of the above-described [1] to [7] further including an adhesive layer disposed at the other side in the thickness direction of the core material layer.

The present invention [9] includes the reinforcement sheet described in any one of the above-described [1] to [8], wherein each of the plurality of unidirectional fiber resin composite sheets contains a carbon fiber or a glass fiber, and a thermosetting resin.

The present invention [10] includes a reinforcement member including the reinforcement sheet described in any one of the above-described [1] to [9], and a metal plate reinforced by the reinforcement sheet.

The present invention [11] includes a reinforcement kit for reinforcing a metal plate by adhering to the metal plate including a core material layer containing a resin and a front layer obtained by laminating a plurality of unidirectional fiber resin composite sheets, wherein the area of a void in a cross section of a solidified material of the core material layer is 50% or less.

The present invention [12] includes a method for producing a reinforcement sheet for reinforcing a metal plate by adhering to the metal plate including the steps of preparing a core material layer containing a resin and having an area ratio of a void in a cross section of a solidified material of the core material layer of 50% or less, preparing a front layer obtained by laminating a plurality of unidirectional fiber resin composite sheets, and attaching the front layer to one side in a thickness direction of the core material layer.

The present invention [13] includes a method for producing a reinforcement member including the steps of preparing a reinforcement sheet including a core material layer containing a resin and having an area ratio of a void in a cross section of a solidified material of the core material layer of 50% or less, and a front Layer disposed at one side in a thickness direction of the core material layer and obtained by laminating a plurality of unidirectional fiber resin composite sheets, and reinforcing a metal plate by attaching the reinforcement sheet to the metal plate.

The present invention [14] includes a method for producing a reinforcement member including the steps of attaching a core material layer containing a resin and having an area ratio of a void in a cross section of a solidified material of the core material layer of 50% or less to a metal plate, and reinforcing the metal plate by attaching a front layer obtained by laminating a plurality of unidirectional fiber resin composite sheets to a surface of the core material layer at the opposite side to the metal plate.

Effect of the Invention

The reinforcement sheet and the reinforcement kit of the present invention include the front layer obtained by laminating the plurality of unidirectional fiber resin composite sheets, and the area ratio of the void in the cross section of the solidified material of the core material layer is the above-described upper limit or less. Thus, improvement of reinforcement properties of the reinforcement sheet and the reinforcement kit with respect to the metal plate can be achieved, and the improvement of the strength of the metal plate (reinforcement member) reinforced by the reinforcement sheet or the reinforcement kit can be achieved.

The reinforcement member of the present invention includes the above-described reinforcement sheet and the metal plate reinforced by the reinforcement sheet. Thus, the improvement of the strength of the reinforcement member can be achieved.

The method for producing a reinforcement sheet of the present invention produces the above-described reinforcement sheet by attaching the front layer to the core material layer. Thus, the above-described reinforcement sheet can be smoothly produced by the easy method.

The method for producing a reinforcement member of the present invention produces the above-described reinforcement member by attaching the above-described reinforcement sheet to the metal plate or by attaching the front layer to the core material layer after attaching the core material layer to the metal plate. Thus, the above-described reinforcement member can be smoothly produced by the easy method.

BRIEF DESCRIPTION OF THE DRAWINGS

FIG. 1 shows a side cross-sectional view of a first embodiment of a reinforcement sheet of the present invention.

FIG. 2 shows a disassembled perspective view of a front layer shown in FIG. 1.

DESCRIPTION OF EMBODIMENTS

First Embodiment

1. Reinforcement Sheet

Figure 3A:
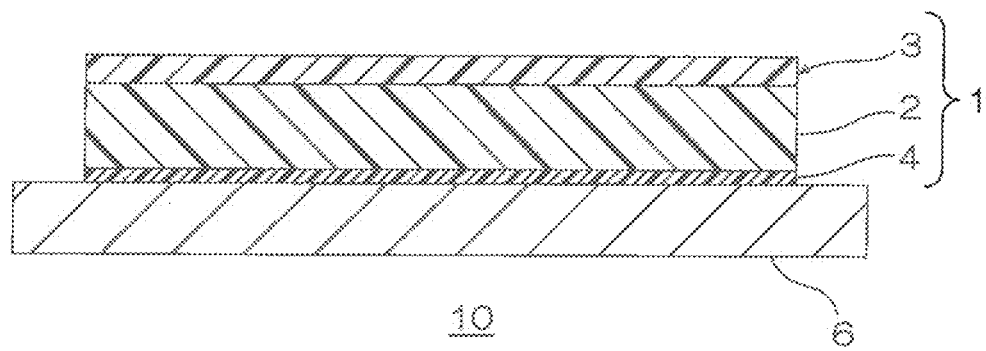
FIG. 3A shows an explanatory view for illustrating a one embodiment of a method for producing a reinforcement member of the present invention, and shows a step of attaching the reinforcement sheet shown in FIG. 1 to a metal plate.

A reinforcement sheet 1 that is a first embodiment of a reinforcement sheet of the present invention is described with reference to FIGS. 1 and 2.

As shown in FIG. 1, the reinforcement sheet 1 has a flat plate shape, and to be specific, has a predetermined thickness. The reinforcement sheet 1 extends in a predetermined direction perpendicular to a thickness direction, and has a flat front surface and a flat rear surface.

In FIG. 1, the up-down direction on the plane of the sheet is the thickness direction of the reinforcement sheet 1. The upper side on the plane of the sheet is one side in the thickness direction, and the lower side on the plane of the sheet is the other side in the thickness direction.

In FIG. 1, the right-left direction on the plane of the sheet is a first plane direction (direction perpendicular to the thickness direction) of the reinforcement sheet 1. The right side on the plane of the sheet is one side in the first plane direction, and the left side on the plane of the sheet is the other side in the first plane direction.

In FIG. 1, the paper thickness direction is a second plane direction (direction perpendicular to both directions of the thickness direction and the first plane direction) of the reinforcement sheet 1. The near side on the plane of the sheet is one side in the second plane direction, and the far side on the plane of the sheet is the other side in the second plane direction.

The reinforcement sheet 1 is a member for reinforcing a metal plate 6 by adhering to the metal plate 6 (ref: FIG. 3B). The reinforcement sheet 1 includes a core material layer 2, a front layer 3 disposed at one side in the thickness direction of the core material layer 2, and an adhesive layer 4 disposed at the other side in the thickness direction of the core material layer 2. That is, the adhesive layer 4, the core material layer 2, and the front layer 3 are sequentially laminated from the other side toward one side in the thickness direction. Preferably, a release layer 5 is releasably attached to the adhesive layer 4. The reinforcement sheet 1 in which the release layer 5 is attached to the adhesive layer 4 is distinguished from the reinforcement sheet 1 without having the release layer 5 as a release layer-including reinforcement sheet 1A.

The core material layer 2 is disposed between the front layer 3 and the adhesive layer 4. The core material layer 2 has a thin layer shape, and to be specific, has a predetermined thickness. The core material layer 2 extends in the predetermined direction perpendicular to the thickness direction, and has a flat front surface (one-side surface in the thickness direction) and a flat rear surface (the other-side surface in the thickness direction). The core material layer 2 contains at least a resin. In the following, the resin contained in the core material layer 2 is referred to as a core material resin.

The core material resin contains, for example, a matrix resin and an elastomer. The core material resin preferably consists of the matrix resin and the elastomer.

The core material resin has a two-phase structure (phase separation structure) containing the matrix resin constituting a medium, and a domain consisting of the elastomer and dispersed in the matrix resin.

FIG. 1 shows a first schematic configuration diagram that enlarges a portion (portion surrounded by a circle) of the core material layer 2 and the front layer 3, and a second schematic configuration diagram that further enlarges the core material rosin (portion surrounded by a square) in the first schematic configuration diagram. In the first schematic configuration diagram, the core material resin is represented as a core material resin 21, and a filler is represented as a filler 20. In the second schematic configuration diagram, the matrix resin is represented as a matrix resin 22, the domain consisting of the elastomer is represented as a domain 23, and a void (pore) is represented as a void 24.

In the two-phase structure, the matrix resin 22 constitutes a continuous phase that is continuous three-dimensionally, and the domain 23 consisting of the elastomer constitutes a dispersed phase that is phase-separated from the matrix resin 22 and dispersed in the matrix resin continuous three-dimensionally, and the domain 23 consisting of the elastomer constitutes a dispersed phase that is phase-separated from the matrix resin 22 and dispersed in the matrix resin 22. The two-phase structure is also referred to as a sea-island structure.

A shape of the domain 23 is not particularly limited. Examples of the shape of the domain 23 include particle shape (amorphous shape), sphere shape, stick shape, and plate shape. The domain 23 has the maximum length (the maximum size) of, for example, 500 μm or less, preferably 250 μm or less, more preferably 100 μm or less, further more preferably 25 μm or less, and for example, 0.01 μm or more, preferably 0.05 μm or more, more preferably 0.1 μm or more. The size of the domain can be measured in conformity with a method described in Examples to be described later.

The matrix resin is a hard resin having a higher Young's modulus than that of the elastomer to be described later. When the matrix resin is in a solidified state, the Young's modulus of the matrix resin is, for example, 1 MPa or more, preferably 5 MPa or more, more preferably 150 MPa or more, further more preferably 1200 MPa or more, particularly preferably above 1500 MPa, and for example, 10000 MPa or less, preferably 5000 MPa or less.

The "solidified state" shows a solid state in which a resin does not have fluidity by cooling at a temperature below a softening temperature when the resin is a thermoplastic resin. Also, the "solidified state" shows a state (C-stage state) in which a resin is completely cured when the resin is a thermosetting resin.

The Young's modulus can be calculated by the following formula (1) by using the result measured by the following tensile test (hereinafter, the same).

Tensile test: a sample having a size of a width of 10 mm×a length of 100 mm is cut out from the matrix resin in a solidified state. Then, the minimum thickness of the central portion of the sample is measured. Next, the sample is measured under the following test conditions.

Test conditions: distance between holder of 50 mm, tensile rate of 1 mm/min, room temperature of 23° C.

$$E = \frac{\Delta F}{S} \times \frac{L}{\Delta L} \quad (1)$$

ΔF: increase in load (0.1→0.4 mm displacement), S: cross-sectional area (thickness×width), L initial length (50 mm), ΔL: increased amount of length Examples of the matrix resin include the thermoplastic resin and the thermosetting resin.

Examples of the thermoplastic resin include polyolefin resin, polycarbonate resin, polyacetal resin, polyamide resin, polyphenylene ether resin, polybutylene terephthalate resin, polyphenylene sulfide resin, thermoplastic polyimide resin, polyether ether ketone resin, thermoplastic urethane resin, polyether imide resin, fluorine resin, and liquid crystal polymer.

Examples of the thermosetting resin include epoxy ream, thermosetting polyimide resin, thermosetting urethane resin, unsaturated polyester, melamine resin, urea resin, phenol resin, alkyd resin, polysulfide resin, and benzoxazine resin.

Of these matrix resins, preferably, a thermosetting resin is used, more preferably, an epoxy resin is used.

The epoxy resin preferably used in the matrix resin is, for example, not modified by a modifier (for example, a rubber modifier to be described later or the like). In the following, the epoxy resin that is not modified is distinguished from the modified epoxy resin (for example, a rubber-modified epoxy resin to be described later or the like) as an unmodified epoxy resin.

To be specific, examples of the unmodified epoxy resin include bisphenol epoxy resin (for example, bisphenol A epoxy resin, bisphenol F epoxy resin, bisphenol S epoxy resin, hydrogenated bisphenol A epoxy resin, or the like), novolak epoxy resin (for example, phenol novolak epoxy resin, cresol novolak epoxy resin, or the like), aromatic epoxy resin (for example, biphenyl epoxy resin, naphthalene epoxy resin, or the like), nitrogen-containing cyclic epoxy resin (for example, triglycidyl isocyanurate, hydantoin epoxy resin, or the like), alicyclic epoxy resin (for example, dicyclo ring-type epoxy resin or the like), glycidyl ether epoxy resin, and aliphatic epoxy resin.

Of these unmodified epoxy resins, preferably, a bisphenol epoxy resin is used, more preferably, a bisphenol A epoxy resin is used.

An epoxy equivalent of the unmodified epoxy resin in an uncured state (A-stage state) is, for example, 80 g/eq. or more, preferably 100 g/eq. or more, and for example, 1000 g/eq. or less, preferably 800 g/eq. or less, more preferably 600 g/eq. or less, further more preferably 300 g/eq. or less. The epoxy equivalent can be measured in conformity with JIS K7236: 2001 (hereinafter, the same).

A commercially available product can be used as the unmodified epoxy resin. Examples of the commercially available product of the unmodified epoxy resin include trade name: JER 828 (epoxy equivalent of 184 g/eq. to 194 g/eq., manufactured by Mitsubishi Chemical Corporation), trade name: JER 834 (epoxy equivalent of 230 g/eq. to 270 g/eq., manufactured by Mitsubishi Chemical Corporation), trade name: JER 1001 (epoxy equivalent of 450 g/eq. to 500 g/eq., manufactured by Mitsubishi Chemical Corporation), trade name: YD-115 (epoxy equivalent of 180 g/eq. to 194 g/eq., manufactured by New Nippon Steel Chemical Co., Ltd.), trade name: YD-134 (epoxy equivalent of 220 g/eq. to 270 g/eq., manufactured by New Nippon Steel Chemical Co., Ltd.), trade name: YD-011 (epoxy equivalent of 440 g/eq. to 510 g/eq., manufactured by New Nippon Steel Chemical Co., Ltd.), and trade name: EP-4100HF (epoxy equivalent of 182 g/eq., manufactured by ADEKA CORPORATION).

These matrix resins can be used alone or in combination of two or more.

A content ratio of the matrix resin in the core material resin is, for example, 20 mass % or more, preferably 30 mass % or more, and for example, 95 mass % or less, preferably 85 mass % or less, more preferably 60 mass % or less.

When the matrix resin contains the thermosetting resin, a state of the thermosetting resin is not particularly limited, and any one of an uncured state (A-stage state), a semi-cured state (B-stage state), and a completely cured state (C-stage state) may be used. Meanwhile, in a state before the reinforcement sheet 1 is used for reinforcement of the metal plate 6 (for example, the release layer-including reinforcement sheet 1A), the state of the thermosetting resin is preferably an uncured state or a semi-cured state, more preferably an uncured state.

The elastomer is a soft resin having a lower Young's modulus than that of the matrix resin, and functions as a toughness imparting agent that imparts toughness to the core material layer 2 in a solidified state. When the elastomer is in a solidified state, the Young's modulus of the elastomer is, for example, 0.1 MPa or more, preferably 0.5 MPa or more, and for example, 3000 MPa or less, preferably 1500 MPa or less, more preferably 1000 MPa or less, further more preferably 500 MPa or less, particularly preferably 100 MPa or less.

Examples of the elastomer include rubber, core-shell-type rubber particles, rubber-modified epoxy resin, and thermoplastic elastomer.

The rubber is a thermosetting soft resin, and examples thereof include natural rubber, diene rubber (for example, acrylonitrile-butadiene rubber (NBR), methyl methacrylate-butadiene-styrene rubber (MBS), styrene-butadiene rubber, isoprene rubber, butadiene rubber, or the like), and non-diene rubber (for example, ethylene-propylene rubber, butyl rubber, silicone rubber, urethane rubber, or the like).

A Mooney viscosity (ML1+4, at 100° C.) of the rubber is, for example, 10 or more, preferably 20 or more, and for example, 80 or less, preferably 60 or less.

The core-shell-type rubber particles include a core portion that substantially consists of the above-described rubber (preferably, diene rubber, more preferably, NBR and/or MBS), and a shell portion that consists of an acrylic polymer and includes the core portion.

The content ratio of the rubber in the core-shell-type rubber particles is, for example, 10 mass % or more, preferably 20 mass % or more, and for example, 99 mass % or Jess, preferably 90 mass % or less.

A commercially available product can be used as the core-shell-type rubber particles. Examples of the commercially available product of the core-shell-type rubber particles include ZEFIAC F351 (manufactured by Aica Kogyo Co., Ltd.), METABLEN C223A (manufactured by Mitsubishi Chemical Corporation), and Kane Ace MX 136 (manufactured by KANEKA CORPORATION).

The rubber-modified epoxy resin is an epoxy resin containing a rubber component, and is a reaction product of the above-described unmodified epoxy resin (preferably, bisphenol epoxy resin, more preferably, bisphenol A epoxy resin and/or bisphenol P epoxy resin) with a rubber modifier.

The rubber modifier is, for example, a modifier obtained by introducing a functional group (for example, carboxyl group or the like) that is capable of reacting with an epoxy group into the above-described rubber. To be specific, examples of the rubber modifier include carboxyl group-terminated butadiene-acrylonitrile rubber (CTBN) and amine group-terminated butadiene-acrylonitrile rubber (ATBN). These rubber modifiers can be used alone or in combination of two or more.

Of these rubber modifiers, preferably, CTBN is used. That is, as the rubber-modified epoxy resin, preferably, an epoxy resin that is modified with CTBN (hereinafter, referred to as a CTBN-modified epoxy resin) is used.

To prepare the rubber-modified epoxy resin, for example, the above-described unmodified epoxy resin is mixed with the above-described rubber modifier, and a catalyst is added thereto as needed to react (be modified) ah for example, 100 to 180° C. In this manner, the functional group of the rubber modifier and the epoxy group react, thereby preparing the rubber-modified epoxy resin.

The content ratio of the rubber component in the rubber-modified epoxy resin is, for example, 5 mass % or more, preferably 15 mass % or more, and for example, 80 mass % or less, preferably 50 mass % or less.

The epoxy equivalent of the rubber-modified epoxy resin in an uncured state (A-stage state) is, for example, 80 g/eq. or more, preferably 200 g/eq. or more, and for example, 10000 g/eq. or less, preferably 2000 g/eq. or less.

A commercially available product can be used as the rubber-modified epoxy resin. Examples of the commercially available product of the rubber-modified epoxy resin include trade name: EPR1415-1 (liquid CTBN-modified epoxy resin, epoxy equivalent of 400 g/eq., manufactured by ADEKA CORPORATION), trade name: EPR2000 (liquid CTBN-modified epoxy resin, epoxy equivalent, of 215 g/eq., manufactured by ADEKA CORPORATION), trade name: HypoxRK84L (solid CTBN modified epoxy resin, epoxy equivalent of 1200 to 1800 g/eq., manufactured by CVC Specialty Chemicals Inc.), and trade name HypoxRA840 (liquid CTBN-modified epoxy resin, epoxy equivalent of 350 g/eq., manufactured by CVC Specialty Chemicals Inc.).

When the elastomer contains the rubber-modified epoxy resin, the state of the rubber-modified epoxy resin is not particularly limited, and any one of an uncured state (A-stage state), a semi-cured state (B-stage state), and a completely cured state (C-stage state) may be used. Meanwhile, in a state before the reinforcement sheet 1 is used for the reinforcement of the metal plate 6 (for example, the release layer-including reinforcement, sheet 1A), the state of the rubber-modified epoxy resin is preferably an uncured state or a semi-cured state, more preferably an uncured state.

The thermoplastic elastomer is a thermoplastic soft resin, and examples thereof include olefin elastomer, styrene elastomer, and vinyl chloride elastomer.

These elastomers can be used alone or in combination of two or more.

Of these elastomers, preferably, at least one kind selected from the group consisting of rubber, core-shell-type rubber particles, and rubber-modified epoxy resin is used, more preferably, a rubber-modified epoxy resin is used, further more preferably, a CTBN-modified epoxy resin is used.

The content ratio of the elastomer in the core material resin is, for example, 5 mass % or more, preferably 15 mass % or more, more preferably 40 mass % or more, and for example, 80 mass % or less, preferably 70 mass % or less.

As a combination of the matrix resin and the elastomer, preferably, the unmodified epoxy resin and the rubber-modified epoxy resin are used in combination, the unmodified-epoxy resin and the core-shell-type rubber particles are used in combination, and the unmodified epoxy resin and the rubber are used in combination, more preferably, the unmodified epoxy resin and the rubber-modified epoxy resin are used in combination.

That is, the matrix resin preferably contains the unmodified epoxy resin, more preferably consists of the unmodified epoxy resin. The elastomer preferably contains the rubber-modified epoxy resin, more preferably consists of the rubber-modified epoxy resin.

When the core material resin includes the combination of the unmodified epoxy resin and the rubber-modified epoxy resin, improvement of reinforcement properties with respect to the metal plate 6 can be surely achieved, and the improvement of the maximum bending testing force of a reinforcement member 10 (described later), and particularly, the improvement of the maximum bending testing force of the reinforcement member 10 (described later) at room temperature (for example, 23° C.) can be surely achieved.

The true density of the core material resin is, for example, 0.7 g/cm³ or more, preferably 1.0 g/cm³ or more, and for example, 3.0 g/cm³ or less, preferably 2.0 g/cm³ or less.

The core material layer 2 preferably further contains a filler as an optional component.

The filler is a hard filler, and is, for example, uniformly dispersed in the core material layer 2 (ref: FIG. 1). Examples of the filler include calcium carbonate (for example, heavy calcium carbonate, light calcium carbonate, Hakuenka, or the like), calcium oxide, talc, mica, clay, mica powder, bentonite, silica (for example, hydrophobic silica or the like), alumina, aluminum silicate, aluminum hydroxide, titanium oxide, barium titanate, ferrite, carbon black, acetylene black, aluminum powder, glass powder, hollow glass (glass balloon), and chopped strands (for example, glass fiber, carbon fiber, aramid fiber, or the like). These fillers can be used alone or in combination of two or more.

Of these fillers, preferably, calcium carbonate and a hollow glass are used, more preferably, a hollow glass is used.

An average particle size of the filler is, for example, 1 μm or more, preferably 10 μm or more, and for example, 100 μm or less, preferably 50 μm or less.

The true density of the filler is, for example, 0.3 g/cm³ or more, preferably 0.5 g/cm³ or more, and for example, 10 g/cm³ or less, preferably 5.0 g/cm³ or less.

The content ratio of the filler with respect to 100 parts by mass of the core material resin is, for example, 10 parts by mass or more, preferably 30 parts by mass or more, more preferably 50 parts by mass or more, and for example, 500 parts by mass or less, preferably 350 parts by mass or less, more preferably 100 parts by mass or less, further more preferably 80 parts by mass or less.

The content ratio (volume ratio) of the filler in the core material layer 2 is, for example, 1% by volume or more, preferably 2% by volume or more, more preferably 7% by volume or more, further more preferably 9% by volume or more, particularly preferably 10% by volume or more, more particularly preferably 16% by volume or mom, further more particularly preferably 20% by volume or more, further more particularly preferably 26% by volume or more, further more particularly preferably 30% by volume or more, further more particularly preferably 40% by volume or more, most preferably 46% by volume or more, and for example, 95% by volume or less, preferably 92% by volume or less, more preferably 89% by volume or less, further more preferably 86% by volume or less, particularly preferably 82% by volume or less, more particularly preferably 80% by volume or less.

The content ratio (mass ratio) of the filler in the core material layer 2 is, for example, 5 mass % or more, preferably 15 mass % or more, mote preferably 30 mass % or more, and for example, below 85 mass %, preferably 80 mass % or less, more preferably 75 mass % or leas, further more preferably below 70 mass %.

When the content ratio (volume ratio, mass ratio) of the filler in the core material layer 2 is the above-described lower limit or more, the Young's modulus of the core material layer 2 can be adjusted within a preferable range (described later), so that the improvement of the maximum bending testing force of the reinforcement member 10 (described later), and particularly, the improvement of the maximum bending testing force of the reinforcement member 10 (described later) at a high temperature region (for example, 80° C. or more) can be achieved. When the content ratio (volume ratio, mass ratio) of the filler in the core material layer 2 is the above-described upper limit or less, the filler can be uniformly dispersed in the core material layer 2, and the core material layer 2 can be stably formed.

When the core material resin contains the thermosetting resin (for example, unmodified epoxy resin, rubber-modified epoxy resin, or the like), the core material layer 2 preferably further contains a latent curing agent as an optional component.

The latent curing agent is solid at room temperature (23° C.), and cures the core material resin at a predetermined temperature. The latent curing agent has, for example, activity at 80° C. or more and 200° C. or less.

Examples of the latent curing agent include urea compound, amine compound, acid anhydride compound, amide compound, cyano compound, dihydrazide compound, imidazole compound, and imidazoline compound.

Examples of the urea compound include 3-(3,4-dichlorophenyl)-1,1-dimethylurea (DCMU), N'-phenyl-N,N-dimethylurea, and 1,1'-(methyl-m-phenylene) bis(3,3'-dimethylurea).

Examples of the amine compound include ethylenediamine, propylenediamine, diethylenetriamine, triethylenetetramine, and amine adduct thereof, methaphenylenediamine, diaminodiphenyl methane, amidiaminodiphenyl sulfone.

Examples of the acid anhydride compound include phthalic anhydride, maleic anhydride, tetrahydrophthalic anhydride, dodecenyl succinic anhydride, dichloro succinic anhydride, benzophenone tetracarboxylic anhydride, and chlorendic anhydride.

An example of the amide compound includes polyamide.

An example of the cyano compound includes dicyandiamide.

An example of the hydraxide compound includes dihydrazide such as adipic acid dihydrazide.

Examples of the imidazole compound include methylimidazole, 2-ethyl-4-methylimidazole, ethylimidazole, isopropylimidazole, 2,4-dimethylimidazole, phenylimidazole, undecylimidazole, heptadecylimidazole, and 2-phenyl-4-methylimidazole.

Examples of the imidazoline compound include methylimidazoline, 2-ethyl-4-methylimidazoline, ethylimidazoline, isopropyl imidazoline, 2,4-dimethylimidazoline, phenylimidazoline, undecylimidazoline, heptadecylimidazoline, and 2-phenyl-4-methylimidazoline.

These latest curing agents can be used alone or in combination of two or more.

Of these latent curing agents, preferably, a urea compound and a cyano compound are used, more preferably, a urea compound and a cyano compound are used in combination, further more preferably, DCMU and dicyandiamide are used in combination.

The content ratio of the latent curing agent with respect to 100 parts by mass of the core material resin is, for example, 0.5 parts by mass or more, preferably 1 part by mass or more, and for example, 30 parts by mass or less, preferably 20 parts by mass or less, more preferably 15 parts by mass or less.

Furthermore, as an optional component, for example, a known additive can be also added to the core material layer 2 at an appropriate ratio as needed. Examples of the known additive include tackifier (for example, rosin resin, terpene resin, coumarone-indene resin, petroleum resin, or the like), lubricant (for example, stearic acid or the like), stabilizer, antiaging inhibitor, oxidation inhibitor, ultraviolet absorber, colorant, flame retardant, antistatic agent, conductivity imparting agent, sliding property imparting agent, and surfactant.

The core material layer 2 has a thickness of, for example, 0.1 mm or more, preferably 1 mm or more, and for example, 20 mm or less, preferably 10 mm or less, more preferably 6 mm or less.

A ratio of the thickness of the core material layer 2 with respect to that of the front layer 3 is, for example, 0.1 or more, preferably 1 or more, more preferably 5 or more, and for example, 50 or less, preferably 40 or less, more preferably 20 or less.

When the core material resin is in a solidified state, the Young's modulus of the core material layer 2 is, for example, 600 MPa or more, preferably 1000 MPa or more, and for example, 7000 MPa or less.

The core material layer 2 does not include the void 24 or includes the plurality of voids 24 (ref: FIG. 1).

An area ratio of the void 24 in a cross section of a solidified material of the core material layer 2 is, for example, 50% or less, preferably 45% or less, more preferably 40% or less, further more preferably 35% or less, particularly preferably 30% or less, and for example, 0% or more, preferably 1% or more, more preferably 5% or more, further more preferably 10% or more, particularly preferably 15% or more. The area ratio of the void 24 can be measured in conformity with the method described in Examples (hereinafter, the same).

When the area ratio of the void 24 is outside of the above-described range, a compression fracture or an interfacial shear fracture of the core material layer 2 may be produced.

Meanwhile, when the area ratio of the void 24 is the above-described upper limit or less, the improvement of the maximum bending testing force of the reinforcement member 10 (described later), and particularly, the improvement of the maximum bending testing force of the reinforcement member 10 (described later) at a high temperature region (for example, 80° C. or more) can be achieved. When the area ratio of the void 24 is the above-described lower limit or more, the improvement of the maximum beading testing force of the reinforcement member 10 (described later), and particularly, the improvement of the maximum bending testing force of the reinforcement member 10 (described later) at room temperature (for example, 23° C.) can be achieved. That is, the compression fracture or the interfacial shear fracture of the com material layer 2 can be suppressed.

The number of the domain 23 of the elastomer per 10624 $\mu m^2$ of the cross-sectional area of the solidified material of the core material layer 2 is, for example, 3 or more, preferably 5 or more, and for example, 100000 or less, preferably 50000 or less. The number of the domain per unit cross-sectional area can be measured in conformity with the method described in Examples (hereinafter, the same).

The number of the domain 23 of the elastomer per 26.56 $\mu m^2$ of the cross-sectional area of the solidified material of the core material layer 2 is, for example, 1 or more, preferably 5 or more, and for example, 250 or less, preferably 125 or less.

When the number of the domain 23 per unit cross-sectional area is the above-described lower limit or more, the improvement of the maximum bending testing force of the reinforcement member 10 (described later), and particularly, the improvement of the maximum bending testing force of the reinforcement member 10 (described later) at room temperature (for example, 23° C.) can be surely achieved. When the number of the domain 23 per unit cross-sectional area is the above-described upper limit or less, particularly, the improvement of the maximum bending testing force of the reinforcement member 10 (described later) at a high temperature region (for example, 80° C. or more) can be achieved.

The area ratio of the domain 23 of the elastomer in the cross section of the solidified material of the core material layer 2 is, for example, 3% or more, preferably 5% or more, more preferably 10% or more, and for example, 50% or less, preferably 40% or less, more preferably 30% or less. The area ratio of the domain 23 can be measured in conformity with the method described in Examples (hereinafter, the same).

When the area ratio of the domain 23 is within the above-described range, the improvement of the maximum bending testing force of the reinforcement member 10 (described later), and particularly, the improvement of the maximum bending testing force of the reinforcement member 10 (described later) at room temperature (for example, 23° C.) can be further more surely achieved.

The front layer 3 is disposed on the from surface (one-side surface in the thickness direction) of the core material layer 2. The front layer 3 has a thin layer shape, and to be specific, has a predetermined thickness. The from layer 3 extends in the predetermined direction perpendicular to the thickness direction, and has a flat front surface and a flat rear surface. In FIG. 1, a size of the front layer 3 is the same as that of the core material layer 2, and the size of the front layer 3 is not limited to this. The front layer 3 may be smaller than the core material layer 2 in the plane direction of the reinforcement sheet 1.

The front layer 3 is obtained by laminating a plurality of unidirectional fiber resin composite sheets 30 (ref: first schematic configuration diagram of FIG. 1). The front layer 3 preferably consists of the plurality of unidirectional fiber resin composite sheets 30.

Each of the plurality of unidirectional fiber resin composite sheets 30 contains a plurality of fibers and a resin. Each of the plurality or unidirectional fiber resin composite sheets 30 is formed by subjecting the resin to impregnation treatment of a fiber substrate consisting of the plurality of fibers. In the following, the resin contained in the unidirectional fiber resin composite sheet 30 is referred to as a front layer resin.

As shown in FIG. 2, each of a plurality of fibers 31 extends in the same direction perpendicular to the thickness direction (hereinafter, referred to as a fiber direction) in each of the plurality of unidirectional fiber resin composite sheets 30. The plurality of fibers 31 are arranged in the direction perpendicular to the fiber direction so as to be generally parallel with each other in each of the unidirectional fiber resin composite sheets 30.

Examples of the fiber include carbon fiber and glass fiber. In each of the unidirectional fiber resin composite sheets 30, these fibers can be used alone or in combination of two or more, and the fiber is preferably used alone. That is, each of the plurality of unidirectional fiber resin composite sheets 30 preferably contains the carbon fiber or the glass fiber. The entire plurality of unidirectional fiber resin composite sheets 30 preferably contain the same kind of fiber.

Of these fibers, preferably, a carbon fiber is used. When the plurality of fibers contain the carbon fiber, the improvement of the reinforcement properties of the reinforcement sheet 1 with respect to the metal plate 6 can be further more surly achieved.

The mass (basis weight) per unit area of the plurality of fibers in each of the unidirectional fiber resin composite sheets 30 is, for example, 10 $g/m^2$ or more, preferably 80 $g/m^2$ or more, and for example, 2000 $g/m^2$ or less, preferably 1000 $g/m^2$ or less.

The front layer resin is impregnated in the plurality of fibers 31. The front layer resin is not particularly limited, and an example thereof includes the above-described thermosetting resin.

In each of the unidirectional fiber resin composite sheets 30, these front layer resins can be used alone or in combination of two or more, and the front layer resin is preferably used alone. The entire plurality of unidirectional fiber resin composite sheets 30 preferably contain the same kind of front layer resin.

Of these front layer resins, preferably, an epoxy resin is used. As the epoxy resin used for the front layer resin, for example, the same epoxy resin (unmodified epoxy resin) as that used for the core material resin is used. These epoxy resins can be used alone or in combination of two or more.

When the front layer resin contains the thermosetting resin, the state of the thermosetting resin is not particularly limited, and any one of an uncured state (A-stage state), a semi-cured state (B-stage state) and a completely cured state (C-stage state) may be used. Meanwhile, in a state before the reinforcement sheet 1 is used for the reinforcement of the metal plate 6 (for example, the release layer-including reinforcement sheet 1A), the state of the thermosetting resin is preferably an uncured state.

The content ratio (resin content ratio) of the front layer resin in each of the unidirectional fiber resin composite sheets 30 is, for example, 10 mass % or more, preferably 20 mass % or more, and for example, 60 mass % or less, preferably 40 mass % or less.

Each of the unidirectional fiber resin composite sheets 30 preferably contains the above-described latent curing agent at an appropriate ratio as an optional component.

When the fiber direction is in a state of being orientated in a tensile direction, and the front layer resin is in a cured slate, a tensile strength per one layer of the plurality of unidirectional fiber resin composite sheets 30 is, for example, 100 MPa or more, preferably 300 MPa or more, and for example, 7000 MPa or less. The tensile strength can be calculated by measuring the maximum testing force (the maximum value of a load in a tensile test) of a sample (the unidirectional fiber resin composite sheet 30), and dividing the obtained maximum testing force by the cross-sectional area (thickness×width) of the sample in conformity with the above-described tensile test (hereinafter, the same).

When the tensile strength of each of the unidirectional fiber resin composite sheets 30 is the above-described lower limit or more, the improvement of the reinforcement properties of the reinforcement sheet 1 with respect, to the metal plate 6 can be further more surely achieved, and the improvement of the maximum bending testing force of the reinforcement member 10 (described later) can be further more surely achieved.

Each of the unidirectional fiber resin composite sheets 30 has a thickness of, for example, 0.01 mm or more, preferably 0.05 mm or more, and for example, 0.5 mm or less, preferably 0.3 mm or less.

A commercially available product can be used as the unidirectional liber ream composite sheet 30. Examples of the commercially available product of the unidirectional fiber resin composite sheet 30 include trade name: P3252S-10 (basis weight of 100 $g/m^2$, resin content ratio of 33 mass %, manufactured by TORAY INDUSTRIES INC.), trade name: P3255-25 (basis weight of 250 $g/m^2$, resin content ratio of 24 mass %, manufactured by TORAY INDUSTRIES INC.), trade name: P17045G-12 (basis weight of 125 g/m², resin content ratio of 24 mass %. manufactured by TORAY INDUSTRIES INC.), trade name: TR395G100S (basis weight of 100 g/m², resin content ratio of 33 mass %, manufactured by Mitsubishi Chemical Corporation), trade name: TR380G250S (basis weight of 250 g/m², resin content ratio of 33 mass %, manufactured by Mitsubishi Chemical Corporation), and trade name: TRH350C125S (basis weight of 125 g/m², resin content ratio of 25 mass %, manufactured by Mitsubishi Chemical Corporation).

The plurality of unidirectional fiber resin composite sheets 30 are laminated in the thickness direction of the reinforcement sheet 1, and laminated so that the fiber directions of the unidirectional fiber resin composite sheets 30 that are next to each other cross (for example, are perpendicular to) each other.

The number (number of lamination) of the plurality of unidirectional fiber resin composite sheets 30 is, for example, two or more, preferably three or more, and for example, below 10.

When the number (number of lamination) of the plurality of unidirectional fiber resin composite sheets 30 is the above-described lower limit or more, the reinforcement properties of the reinforcement sheet 1 with respect to the metal plate 6 can be ensured. When the number (number of lamination) of the plurality of unidirectional fiber resin composite sheets 30 is the above-described upper limit or less, the number of lamination of the plurality of unidirectional fiber resin composite sheets 30 can be reduced, and a reduction in production cost of the front layer 3 can be achieved.

The front layer 3 has a thickness of, for example, 0.02 mm or more, preferably 0.15 mm or more, and for example, 5 mm or less, preferably 1 mm or less, more preferably 0.5 mm or less.

As shown in FIG. 1, the adhesive layer 4 is disposed on the rear surface (the other-side surface in the thickness direction) of the core material layer 2. The adhesive layer 4 has a thin layer shape, and to be specific, has a predetermined thickness. The adhesive layer 4 extends in the predetermined direction perpendicular to the thickness direction, and has a flat front surface and a flat rear surface. The adhesive layer 4 is, for example, formed from a known adhesive or a known double-coated adhesive tape.

An adhesive that forms the adhesive layer 4 is in a paste state, and examples thereof include epoxy adhesive, urethane adhesive, and acrylic adhesive. These adhesives can be used alone or in combination of two or more.

The double-coated adhesive tape that forms the adhesive layer 4 includes, for example, a substrate, and the above-described adhesive that is laminated on both surfaces of the substrate. An example of the double-coated adhesive tape that forms the adhesive layer 4 includes a thermosetting double-coated tape NA590 manufactured by NITTO DENKO CORPORATION. The adhesive layer 4 is preferably formed from a double-coated adhesive tape.

The adhesive layer 4 has a thickness of, for example, 0.05 mm or more, preferably 0.1 mm or more, and for example, 1 mm or less, preferably 0.5 mm or less.

The release layer 5 is positioned at the opposite side of the adhesive layer 4 with respect to the core material layer 2. The release layer 5 is releasably attached to the front surface of the adhesive layer 4 so as to protect the adhesive layer 4 until the reinforcement sheet 1 is used for forming the reinforcement member 10 (described later). That is, the release layer 5 is a layer that is laminated on the front surface of the adhesive layer 4 so as to cover the front surface of the adhesive layer 4 at the time of shipping, conveyance, and storage of the reinforcement sheet 1, and has flexibility that can be peeled from the front surface of the adhesive layer 4 so as to curve in a generally U-shape immediately before the use of the reinforcement sheet 1.

The attached surface of the release layer 5 is subjected to release treatment as needed. Examples of a material for the release layer 5 include resin materials such as polyester (for example, polyethylene terephthalate (PET) or the like), polyolefin (for example, polyethylene, polypropylene, or the like), and fluorine resin (for example, polytetrafluoroethylene (PTFE) or the like) and resin coat paper. Preferably, polyethylene terephthalate is used.

The release layer 5 may not be attached to the adhesive layer 4. In this case, the adhesive layer 4 of the reinforcement sheet 1 is exposed.

2. Producing Method of Reinforcement Sheet

Next, a method for producing the reinforcement sheet 1 as the first embodiment of a method for producing a reinforcement sheet of the present invention is described.

The method for producing the reinforcement sheet 1 includes a core material preparing step of preparing the core material layer 2, a front layer preparing step of preparing the from layer 3, an attaching step of attaching the front layer 3 to one side in the thickness direction of the core material layer 2, and an adhesive layer forming step of forming the adhesive layer 4 at the other side in the thickness direction of the core material layer 2.

In the core material preparing step, first, the above-described matrix resin, the above-described elastomer, and if necessary, the above-described optional component (filler, latent curing agent, and additive) are kneaded so as to have the above-described content ratio, thereby preparing a resin composition (kneaded product). In the following, the details of a case where the above-described matrix resin contains the thermosetting resin are described.

In the core material preparing step, the thermosetting resin contained in the matrix resin is preferably in an uncured state.

When the elastomer contains the rubber, preferably, the rubber in a bale-shape (block-shape) is kneaded to be added to the matrix resin.

When the elastomer contains the core-shell-type rubber particles, preferably, the powdery core-shell-type rubber parades are added to the matrix resin.

When the elastomer contains the rubber-modified epoxy resin, preferably, the matrix resin is added to the rubber-modified epoxy resin in an uncured state.

When the elastomer contains the thermoplastic elastomer, preferably, the matrix resin is added to the thermoplastic elastomer in a pellet-shape.

A kneading method of each of the components is not particularly limited, and an example thereof includes kneading with a mixing roll. The kneading of each of the components is preferably carried out under vacuum deaeration.

The kneading time is, for example, one minute or more, preferably five minutes or more, and for example, 60 minutes or less, preferably 30 minutes or less, more preferably 15 minutes or less.

When the kneading time is the above-described lower limit or more, each of the components can be sufficiently kneaded. When the kneading time is the above-described upper limit or less, the area ratio of the void 24 in the cross section of the solidified material of the core material layer 2 can be surely adjusted within the above-described range.

A kneading temperature is, for example, room temperature (23° C.) or more, preferably 80° C. or more, more preferably 100° C. or more, and for example, below 150° C., preferably 130° C. or less. When the resin composition contains the latent curing agent, the kneading, temperature is below the temperature at which the latent curing agent substantially reacts, in the case of below the temperature at which the latent curing agent substantially reacts, heating may be carried out so that the kneading temperature is above room temperature (23° C.).

By adjusting the kneading conditions (kneading method, kneading time, kneading temperature, or the like), the area ratio of the void 24 in the cross section of the solidified material of the core material layer 2 can be adjusted within the above-described range. Also, in the kneading of each of the components, a foaming agent is further added thereto, and the area ratio of the void 24 in the cross section of the solidified material of the core material layer 2 may be adjusted within the above-described range.

Next, the resin composition is sandwiched between two release paper to be rolled by, for example, press molding or the like.

In this manner, the core material layer 2 is prepared between the two release paper.

As described above, when the core material resin contains the thermosetting resin (matrix resin) and/or the rubber-modified epoxy resin (elastomer), the thermosetting resin (matrix resin) and/or the rubber-modified epoxy resin (elastomer) are/is preferably in an uncared state.

Thus, when the state of the thermosetting resin and/or the rubber-modified epoxy resin retains the uncured state in the core material layer 2, preparation of the core material layer 2 is completed without heating the core material layer 2.

Meanwhile, when the state of the thermosetting resin and/or the rubber-modified epoxy resin is brought into a semi-cured stale (B-stage state) or a completely cured state (C-stage state) in the core material layer 2, the core material layer 2 is heated, so that the core material resin is brought into the semi-cured state or the completely cured state.

A heating temperature of the core material layer 2 is a temperature at which the latent curing agent substantially reacts or more, and is, for example, 80° C. or more, preferably 150° C. or more, and for example, 250° C. or less.

In this way, the preparation of the core material layer 2 containing the thermosetting resin is completed.

When the matrix resin contains the thermoplastic resin, the matrix resin (for example, thermoplastic resin in a pellet-shape), the elastomer (for example, powdery rubber, powdery core-shell-type rubber particles, powdery cured product of the rubber-modified epoxy resin, thermoplastic elastomer in a pellet-shape, or the like), and if necessary, the above-described optional component (filler and additive) are melted and kneaded so as to have the above-described content ratio, so that the resin composition is, for example, extruded and molded into a sheet shape. In this manner, the core material layer 2 containing the thermoplastic resin can be prepared.

In the front layer preparing step, first, the plurality of unidirectional fiber rosin composite sheets 30 are prepared.

As shown in FIG. 2, the plurality of unidirectional fiber resin composite sheets 30 are laminated in the thickness direction so that the fiber directions of the unidirectional fiber resin composite sheets 30 that are next to each other cross (for example, are perpendicular to) each other.

Thereafter, the laminated plurality of unidirectional fiber resin composite sheets 30 are pressed so as to be sandwiched from the outside in the thickness direction.

In this manner, the front layer 3 is prepared.

As shown in FIG. 1, in the attaching step, first, the two release paper is peeled from the core material layer 2. Then, the front layer 3 is disposed on the front surface (one-side surface in the thickness direction) of the core material layer 2 to be pressed so that the front layer 3 goes toward the core material layer 2 as needed.

In this manner, the front layer 3 is attached to the core material layer 2.

Next, in the adhesive layer forming step, when the adhesive layer 4 is formed from an adhesive, the adhesive is applied to the rear surface (the other-side surface in the thickness direction) of the core material layer 2 by a known method. When the adhesive layer 4 is formed from a double-coated adhesive tape, the double-coated adhesive tape is attached to the rear surface (the other-side surface in the thickness direction) of the core material layer 2.

In this manner, the adhesive layer 4 is formed on the rear surface (the other-side surface in the thickness direction) of the core material layer 2.

In this way, the reinforcement sheet 1 including the core material layer 2, the front layer 3 that is disposed on the front surface (one side in the thickness direction) of the core material layer 2, and the adhesive layer 4 that is disposed on the rear surface (the other side in the thickness direction) of the core material layer 2 is produced (prepared).

Thereafter, the release layer 5 is attached to the adhesive layer 4 as needed. In this manner, the release layer-including reinforcement sheet 1A is produced.

3. Reinforcement of Metal Plate by Reinforcement Sheet (Producing Method of Reinforcement Member)

Figure 3B:
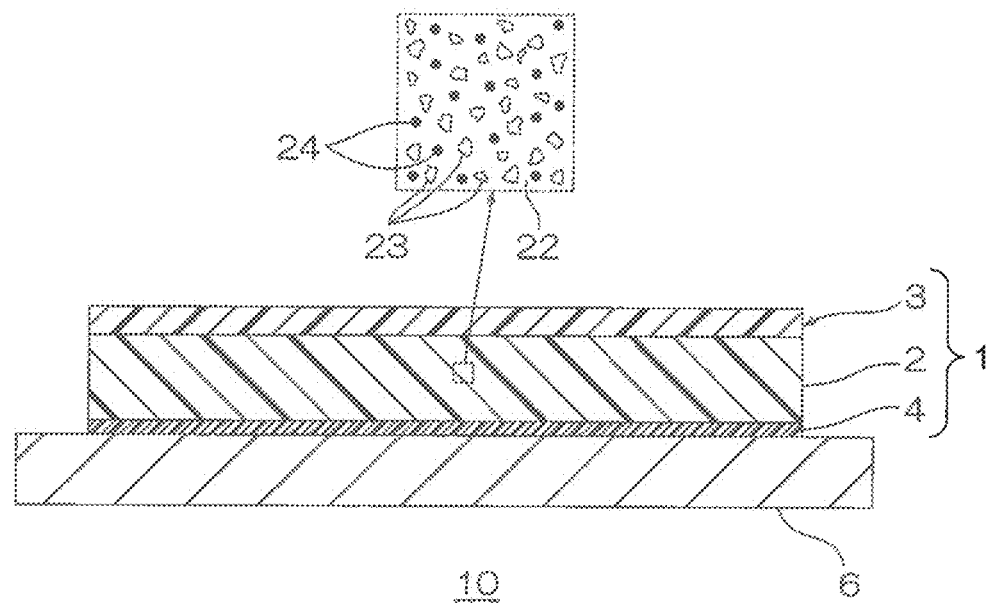
FIG. 3B, subsequent to FIG. 3A, shows a step of curing an adhesive layer and if necessary, a core material resin and a front layer resin.

As shown in FIGS. 3A and 3B, the reinforcement sheet 1 reinforces the metal plate 6 by adhering to the metal plate 6.

The metal plate 6 is a metal plate used for various industrial products, and is not particularly limited. Examples of the metal plate 6 include metal plates used for transportation machines (for example, pillar, roof, fender, hood, trunk, quarter panel, door, door handle, door mirror of automobiles, or the like), and metal plates used for household electric appliances. Preferably, a metal plate used for a transportation machine is used.

In FIG. 3A, the metal plate 6 has a flat plate shape for convenience. However, the shape of the metal plate 6 is not particularly limited. Examples of the shape thereof include flat plate shape and tubular shape (for example, cylindrical shape, rectangular cylindrical shape, or the like).

To reinforce the metal plate 6 by the reinforcement sheet 1, alter the release layer 5 is peeled from the adhesive layer 4 as needed (ref. FIG. 1), the exposed adhesive layer 4 is attached to the front surface of the metal plate 6. In this manner, the reinforcement sheet 1 is disposed on the metal plate 6.

Next, as shown in FIG. 3B, the metal plate 6 on which the reinforcement sheet 1 is disposed is heated, and the adhesive layer 4 is cured.

The heating temperature is, for example, 80° C. or more, preferably 150° C. or more, and for example, 250° C. or less.

The heating time is, for example, 5 minutes or more, preferably 10 minutes or more, and for example, 80 minutes or less, preferably 60 minutes or less.

When the front layer 3 contains the thermosetting resin in an uncured state before beating, the above-described beating temperature is set at a temperature at which the latent curing agent substantially reacts or more, and the thermosetting resin in an uncured state is simultaneously cured (brought into a completely cured state).

When the core material layer 2 contains the thermosetting resin (matrix resin) in an uncured state and/or the rubber-modified epoxy resin (elastomer) in an uncured state before heating, the above-described heating temperature is set at a temperature at which the latent curing agent substantially reacts or more, and the thermosetting resin in an uncured state and/or the rubber-modified epoxy resin in an uncured state are/is simultaneously cured (brought into a completely cured state).

In this way, the reinforcement sheet 1 reinforces the metal plate 6 by adhering to the metal plate 6. Also, the reinforcement member 10 including the reinforcement sheet 1, and the metal plate 6 that is reinforced by the reinforcement sheet 1 is produced.

As described above, when the front layer resin and/or the core material resin contain(s) the thermosetting resin, or when the thermosetting resin contains the robber-modified epoxy resin, the state of the thermosetting resin and/or the rubber-modified epoxy resin is preferably different from each other before or after the use of the reinforcement sheet 1.

In the reinforcement sheet 1 in the reinforcement member 10, the thermosetting resin and/or the rubber-modified epoxy resin are/is preferably in a completely cured state, while in a state before the reinforcement sheet 1 is used for the reinforcement (for example, the release layer-including reinforcement sheet 1A), the thermosetting resin and/or the rubber-modified epoxy resin are/is preferably in an uncured state or in a semi-cured state.

The reinforcement sheet 1 before the use (for example, the release layer-including reinforcement sheet 1A) and the reinforcement sheet 1 in the reinforcement member 10 have the same structure except for the above-described cured state of the resin.

In the reinforcement member 10, each of the range of the area ratio of the void 24 in the cross section of the solidified material (completely cured product) of the core material layer 2, the range of the number of the domain 23 of the elastomer per 10624 $\mu m^2$ of the cross-sectional area of the solidified material (completely cured product) of the core material layer 2, the range of the number of the domain 23 of the elastomer per 26.56 $\mu m^2$ of the cross-sectional area of the solidified material (completely cured product) of the core material layer 2, and the range of the area ratio of the domain 23 of the elastomer in the cross section of the solidified material (completely cured product) of the core material layer 2 is the same as the above-described range.

The maximum bending testing force at room temperature (23° C.) of the reinforcement member 10 is, for example, 400 N or more, preferably 500 N or more, more preferably 600 N or more. The maximum bending testing force can be measured in conformity with the method described in Examples (hereinafter, the same).

The maximum bending testing force at 100° C. of the reinforcement member 10 is, for example, 150 N or more, preferably 200 N or more, more preferably 300 N or more.

Figure 4A:
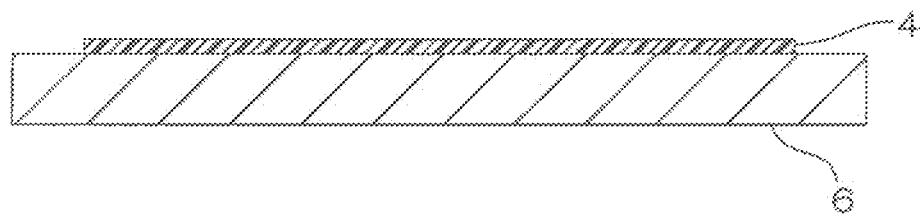
FIG. 4A shows an explanatory view for illustrating another embodiment of a method for producing a reinforcement member of the present invention, and shows a step of forming an adhesive layer on a metal plate.
Figure 4B:
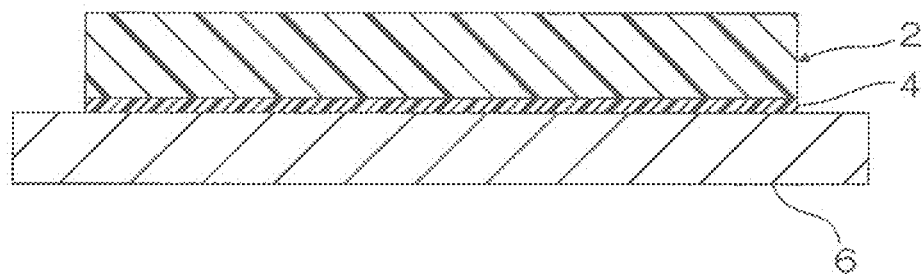
FIG. 4B, subsequent to FIG. 4A, shows a step of attaching a core material layer to the adhesive layer.
Figure 4C:
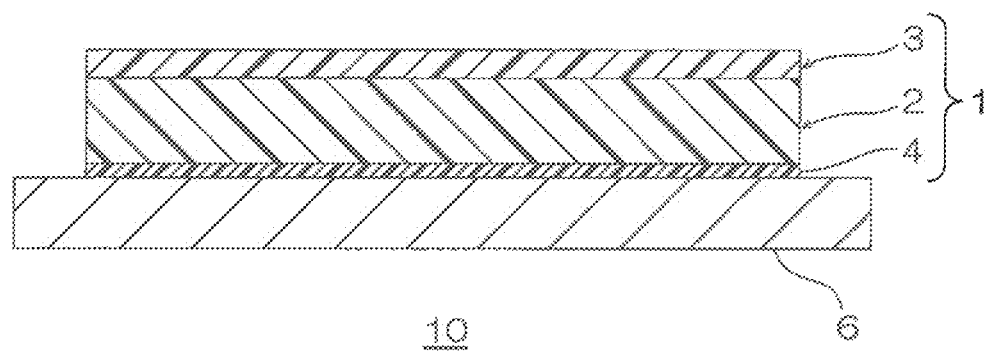
FIG. 4C, subsequent to FIG. 4B, shows a step of attaching a front layer to the core material layer.

As shown in FIGS. 4A to 4C, the reinforcement member 10 can be also produced by sequentially laminating the adhesive layer 4, the core material layer 2, and the front layer 3 on the metal plate 6.

To be specific, as shown in FIG. 4A, first, the adhesive layer 4 is formed on the metal plate 6.

Next, as shown in FIG. 4B, the core material layer 2 is disposed on the surface of the adhesive layer 4 at the opposite side to the metal plate 6 to be pressed so that the core material layer 2 goes toward the adhesive layer 4 as needed. In this manner, the core material layer 2 is attached to the surface of the adhesive layer 4 at the opposite side to the metal plate 6. In other words, the core material layer 2 is attached to the metal plate 6 by the adhesive layer 4.

Next, as shown in FIG. 4C, the front layer 3 is disposed on the surface of the core material layer 2 at the opposite side to the metal plate 6 to be pressed so that the front layer 3 goes toward the core material layer 2 as needed. In this manner, the front layer 3 is attached to the surface of the core material layer 2 at the opposite side to the metal plate 6.

In this way, the reinforcement sheet 1 including the adhesive layer 4. the core material layer 2, and the front layer 3 is disposed on Die metal plate 6.

Thereafter, as shown in FIG. 3B, the metal plate 6 on which the reinforcement sheet 1 is disposed is heated in the same manner as the description above, and the adhesive layer 4, and if necessary, the core material resin and the front layer resin are cured.

In this manner, the reinforcement sheet 1 reinforces the metal plate 6 by adhering to the metal plate 6. Also, the reinforcement member 10 is produced.

As shown in FIG. 1, the reinforcement sheet 1 includes the front layer 3 obtained by laminating the plurality of unidirectional fiber resin composite sheets 30, and when a load is applied from the outside to the reinforcement member 10, the front layer 3 is disposed on the front surface of the core material layer 2 to which the largest tensile stress is applied. Thus, the improvement of the reinforcement properties of the reinforcement sheet 1 with respect to the metal plate 6 can be achieved compared to a case where the front layer 3 is formed from glass cloth.

When the number (number of lamination) of the plurality of unidirectional fiber resin composite sheets 30 is increased in the reinforcement sheet 1, and the reinforcement, sheet 1 consists of the plurality of unidirectional fiber resin composite sheets 30, the reinforcement properties of the reinforcement sheet 1 with respect to the metal plate 6 can be sufficiently ensured. However, there is a disadvantage that when the number (number of lamination) of the plurality of unidirectional fiber resin composite sheets 30 is increased, the number of steps of laminating those is increased, the production (preparation) step of the front layer 3 is complicated, and accordingly, the production cost of the reinforcement sheet 1 is increased.

Meanwhile, the reinforcement sheet 1 includes the core material layer 2 in which the area ratio of the void 24 in the cross section of the solidified material is the above-described upper limit or less, so that the reinforcement properties of the reinforcement sheet 1 with respect to the metal plate 6 can be sufficiently ensured, while a reduction in the number (number of lamination) of the plurality of unidirectional fiber resin composite sheets 30 included in the front layer 3 can be achieved.

Thus, compared to a case where the reinforcement sheet 1 consists of the plurality of unidirectional fiber resin composite sheets 30 without including the core material layer 2, the improvement of the strength (to be specific, the maximum bending testing force or the like) of the reinforcement member 10 can be achieved, while a reduction in the production cost can be achieved.

The core material resin 21 preferably contains the matrix resin 22, and the elastomer forming a two-phase structure dispersed in the matrix resin 22, and has the number of the domain 23 consisting of the elastomer per 10624 $\mu m^2$ of the cross-sectional area of the solidified material of the core material layer 2 of the above-described lower limit or more, and more preferably has the number of the domain 23 consisting of the elastomer per 26.56 $\mu m^2$ of the cross-sectional area of the solidified material of the core material layer 2 of the above-described lower limit or more.

Thus, the domain 23 can be surely dispersed in the core material resin 21, and the improvement of the maximum bending testing force of the reinforcement member 10, and particularly, the improvement of the maximum bending testing force of the reinforcement member 10 at room temperature (for example, 23° C.) can be surely achieved.

The area ratio of the domain 23 in the cross section of the solidified material of the core material layer 2 is preferably the above-described upper limit or less.

Thus, the improvement of the maximum bending testing force of the reinforcement member 10, and particularly, the improvement of the maximum bending testing force of the reinforcement member 10 at room temperature (for example, 23° C.) can be further more surely achieved.

The matrix resin preferably contains an unmodified epoxy core material resin, and the elastomer preferably contains a rubber-modified epoxy core material resin.

Thus, the improvement of compatibility of the matrix resin with the elastomer can be achieved, and the improvement of the maximum bending testing force of the reinforcement member 10, and particularly, the improvement of the maximum bending testing force of the reinforcement member 10 at room temperature (for example, 23° C.) can be further more surely achieved.

The core material layer 2 preferably further contains the filler 20. The content ratio of the filler 20 in the core material layer 2 is preferably the above-described lower limit or more. Thus, the Young's modulus of the core material layer 2 can be adjusted in a preferable range, so that the improvement of the strength of the reinforcement member 10, and particularly, the improvement of the strength of the reinforcement member 10 at a high temperature region (for example, 80° C. or more) can be achieved. The content ratio of the filler 20 in the core material layer 2 is preferably below the above-described upper limit. Thus, the filler can be uniformly dispersed in the core material layer 2, and the core material layer 2 can be stably formed.

The reinforcement sheet 1 preferably further includes the adhesive layer 4 that is disposed at the other side in the thickness direction of the core material layer 2. Thus, the reinforcement sheet 1 can surely adhere to the metal plate 6.

Each of the unidirectional fiber resin composite sheets 30 preferably contains the carbon fiber or the glass fiber, and the thermosetting resin. Thus, the improvement of the reinforcement properties of the reinforcement sheet 1 with respect to the metal plate 6 can be more surely achieved, and the improvement of the strength of the reinforcement member 10 can be further more surely achieved.

As shown in FIG. 3B, the reinforcement member 10 includes the reinforcement sheet 1, and the metal plate 6 that is reinforced by the reinforcement sheet 1. Thus, the improvement of the strength of the reinforcement member 10 can be achieved.

As shown in FIG. 1, the reinforcement sheet 1 can be produced by the easy method of attaching the front layer 3 to the core material layer 2. Thus, the reinforcement sheet 1 can be smoothly produced.

The reinforcement member 10 is produced by the easy method of attaching the reinforcement sheet 1 to the metal plate 6 as shown in FIG. 3B, or attaching the front layer 3 to the core material layer 2 after attaching the core material layer 2 to the metal plate 6 as shown in FIGS. 4A to 4C. Thus, the reinforcement member 10 can be smoothly produced.

Second Embodiment

Figure 5A:
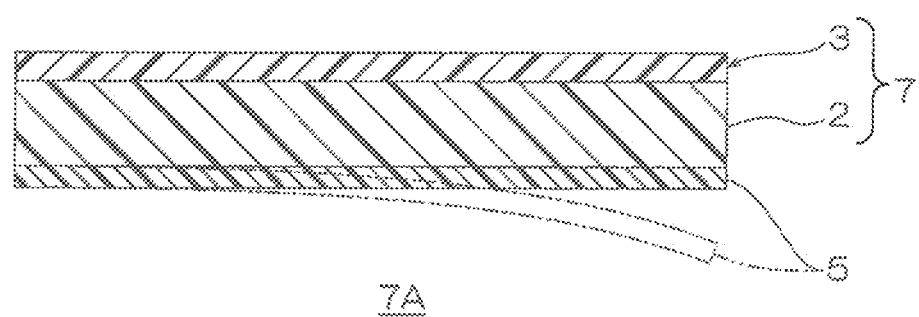
FIG. 5A shows a side cross-sectional view of a second embodiment of a reinforcement sheet of the present invention.

Next, a reinforcement sheet 7 as a second embodiment of a reinforcement sheet of the present invention is described with reference to FIGS. 5A and 5B. The same reference numerals are provided for members and steps corresponding to each of those in the above-described first embodiment, and their detailed description is omitted.

As shown in FIG. 1, the reinforcement sheet 1 includes the adhesive layer 4 However, the reinforcement sheet of the present invention may not include an adhesive layer. The reinforcement sheet 7 does not include the adhesive layer 4, and includes the core material layer 2 and the front layer 3. The reinforcement sheet 7 preferably consists of the core material layer 2 and the front layer 3. In the reinforcement sheet 7, the core material layer 2 preferably has surface tackiness.

The release layer 5 is releasably attached to the surface of the core material layer 2 at the opposite side to the front layer 3. The reinforcement sheet 7 in which the release layer 5 is attached to the core material layer 2 is distinguished from the reinforcement sheet 7 without having the release layer 5 as a release layer-including reinforcement sheet 7A. The release layer 5 may not be attached to the core material layer 2. In this case, the other-side surface in the thickness direction of the core material layer 2 is exposed.

Figure 5B:
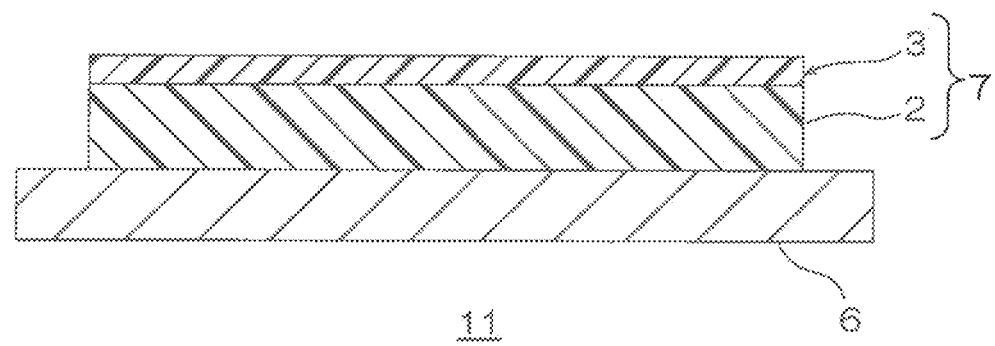
FIG. 5B shows a state in which the reinforcement sheet shown in FIG. 5A adheres to a metal plate.

As shown in FIG. 5B, to reinforce the metal plate 6 by the reinforcement sheet 7, after the release layer 5 is peeled from the core material layer 2 as needed, the exposed core material layer 2 is attached to the front surface of the metal plate 6. In this manner, the reinforcement sheet 7 is disposed on the metal plate 6.

Next, the metal plate 6 on which the reinforcement sheet 7 is disposed is heated as needed in the same manner as the description above, and the core material resin and the front layer resin are cured.

In this way, the reinforcement sheet 7 reinforces the metal plate 6 by adhering to the metal plate 6. Also, a reinforcement member 11 including the reinforcement sheet 7 and the metal plate 6 that is reinforced by the reinforcement sheet 7 is produced. The reinforcement member 11 can be also produced by sequentially laminating the core material layer 2 and the front layer 3 on the metal plate 6.

In the second embodiment, the same function and effect as that of the first embodiment can be achieved.

<Reinforcement Kit>

Figure 6:
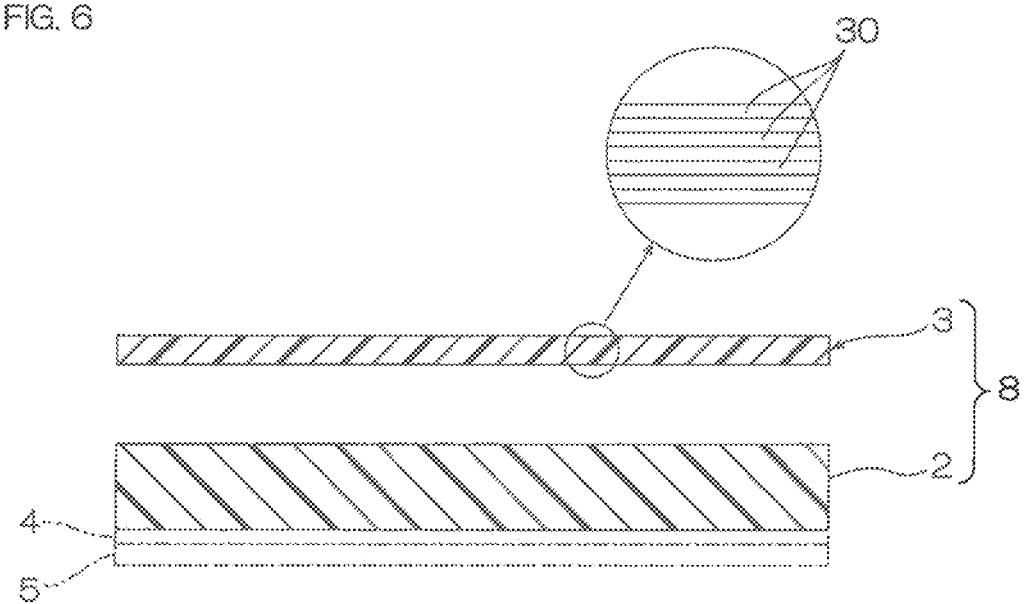
FIG. 6 shows a side cross-sectional view of a one embodiment of a reinforcement kit of the present invention.

Next, a reinforcement kit 8 as a one embodiment of a kit of the present invention is described with reference to FIG. 6. In the description of the reinforcement kit 8, the same reference numerals are provided for members and steps corresponding to each of those in the above-described first embodiment of the reinforcement sheet 1, and their detailed description is omitted.

As shown in FIG. 1, the reinforcement sheet 1 is uniformly constituted by attaching the core material layer 2 and the front lava 3 to each other. However, as shown in FIG. 6, in the reinforcement kit 8, the core material layer 2 is separated from the front layer 3 as separate pieces.

That is, the reinforcement kit 8 includes the core material layer 2 and the front layer 3 that are separate nieces. In the reinforcement kit 8, as shown by a phantom line, the adhesive layer 4 may be formed on the rear surface (the other-side surface in the thickness direction) of the core material layer 2. Also, as shown by the phantom line, the release layer 5 may be releasably attached to the adhesive layer 4.

The reinforcement kit 8 is a kit that reinforces the metal plate 6 by adhering to the metal plate 6. In the reinforcement kit 8, the core material layer 2 and the front layer 3 are simultaneously circulated and sold as one package to be simultaneously used. To reinforce the metal plate 6 by the reinforcement kit 8, after attaching the core material layer 2 to the metal plate 6, the front layer 3 is attached to the surface of the core material layer 2 at the opposite side to the metal plate 6 to be next heated as needed in the same manner as the description above, so that the core material resin and the front layer resin are cured.

In the reinforcement kit 8, each of the range of the area ratio of the void 24 in the cross section of the solidified material (completely cured product) of the core material layer 2, the range of the number of the domain 23 of the elastomer per 10624 μm$^2$ of the cross-sectional area of the solidified material (completely cured product) of the core material layer 2, the range of the number of the domain 23 of the elastomer per 26.56 μm$^2$ of the cross-sectional area of the solidified material (completely cured product) of the core material layer 2, and the range of the area ratio of the domain 23 in the cross section of the solidified material (completely cured product) of the core material layer 2 is the same as the above-described range.

In this way, the reinforcement kit 8 reinforces the metal plate 6 by adhering to the metal plate 6. Thus, in the reinforcement kit 8, the same function and effect as that of the first embodiment can be achieved.

MODIFIED EXAMPLES

In each of the modified examples below, the same reference numerals are provided for members and steps corresponding to each of those in the above-described first embodiment, and their detailed description is omitted.

As shown in FIG. 1, in the reinforcement sheet 1, the front layer 3 is disposed on the front surface (one-side surface in the thickness direction) of the tore material layer 2, and the adhesive layer 4 is disposed on the rear surface (the other-side surface in the thickness direction) of the core material layer 2. However, the reinforcement sheet of the present invention is not limited to this.

A substrate can be also disposed between the front layer 3 and the core material layer 2 and/or between the adhesive layer 4 and the core material layer 2. Examples of the substrate include glass cloth, carbon cloth, synthetic resin non-woven fabric (for example, polypropylene resin non-woven fabric, polyethylene resin non-woven fabric, ester resin non-woven fabric, or the like), metal foil, carbon fiber of short fiber, glass fiber of short fiber, and polyester film.

An adhesive layer that is constituted in the same manner as that of the adhesive Layer 4 can be also disposed between the front layer 3 and the core material layer 2.

In the modified examples, the same function and effect as that of the first embodiment can be achieved.

The first embodiment, the second embodiment, and the modified examples can be appropriately used in combination.

EXAMPLES

Next, the present invention is further described based on Examples and Comparative Examples shown below. The present invention is however not limited by these Examples and Comparative Examples. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

Examples 1 to 5

1. Preparation of Front Layer

The unidirectional fiber resin composite sheet (manufactured by TORAY INDUSTRIES INC., thickness of 0.10 mm) was prepared in the number shown in Table 1. The unidirectional fiber resin composite sheet, included a plurality of carbon fibers (CFUD, basis weight of 100 g/m$^2$) that extended in the same fiber direction and were arranged in a direction perpendicular to the fiber direction so as to be generally parallel with each other, and an epoxy resin (front layer resin, content ratio of 33 mass %) that was impregnated in the plurality of carbon, fibers. When the front layer resin was in a cured state, the tensile strength of each of the unidirectional fiber resin composite sheets was 2500 MPa.

The plurality of unidirectional fiber resin composite sheets were laminated so that, the fiber directions of the unidirectional fiber resin composite sheets that were next to each other were perpendicular to each other. Thereafter, the plurality of unidirectional fiber resin composite sheets were pressed so as to be sandwiched from the outside in the thickness direction, thereby preparing the front layer.

2. Preparation of Core Material Layer

The matrix resin, the elastomer, the filler, and the latent curing agent were kneaded in accordance with the formulation shown in Table 1 with the mixing roll, thereby preparing the resin composition. The kneading time was five minutes, and the kneading temperature was 120° C.

Thereafter, the resin composition was sandwiched between the two release paper to be rolled by the press molding, thereby preparing the core material layer having a thickness shown in Table 1. The core material resin in the core material layer was in an uncured state. The Young's modulus of the core material layer when the core material resin is in a cured state is shown in Table 1.

3. Preparation of Adhesive Layer

Each of the following components was blended to be kneaded with the mixing roll, thereby preparing a kneaded product (thermosetting resin composition). In the kneading, first, the epoxy resin, the rubber-modified epoxy resin, the filler, and the toughness imparting agent were kneaded with the mixing roll that was heated at 120° C., and thereafter, the kneaded product was cooled to 60 to 100° C. Furthermore, the latent curing agent was added thereto to be kneaded with the mixing roll, thereby obtaining the kneaded product.

Bisphenol A epoxy resin (trade name: Epikote (registered trademark) #834, epoxy equivalent of 270 g/eq., manufactured by Mitsubishi Chemical Corporation) . . . 50 parts by mass Liquid CTBN-modified epoxy resin (trade name: EPR 1415-1, epoxy equivalent of 400 g/eq., manufactured by ADEKA CORPORATION) . . . 35 parts by mass Solid CTBN-modified epoxy resin (trade name: HypoxRK84L, epoxy equivalent of 1200 to 1800 g/eq., manufactured by CVC Specialty Chemicals Inc.) . . . 15 parts by mass Urea compound: 3-(3,4-dichlorophenyl)-1,1-dimethyl-urea (trade name: DCMU, manufactured by Hodogaya Chemical Co., Ltd.) . . . 2 pans by mass Dicyandiamide (trade name: DDA-50, manufactured by CVC Specialty Chemicals Inc.) . . . 5 parts by mass Hydrophobic silica: dimethyl silicone oil surface-treated silica (trade name: AEROJIL RY200, average particle size of 12 μm, manufactured by NIPPON AEROSIL CO., LTD.) . . . 2 parts by mass Glass powder: glass powder (trade name: PF70E-001, specific gravity of 2.58, average fiber length of 10.5 μm, manufactured by Nitto Boseki Co., Ltd.) . . . 20 parts by mass Next, the obtained kneaded product in a state of being sandwiched between the release paper was rolled to have a thickness of 0.1 mm by the press molding, thereby forming the thermosetting resin layer.

Thereafter, the release paper on the one-side surface of the thermosetting resin layer was peeled, and the thermosetting resin layer was attached to both surfaces of the non-woven fabric (trade name: 8004, manufactured by NISSEI Co., Ltd) having a thickness of 130 pm by heat press (50° C.) so as to have a total thickness of the thermosetting resin layer and the substrate of 0.2 mm, thereby preparing the double-coated adhesive tape.

4. Attaching of Front Layer and Adhesive Layer to Core Material Layer

Next, the front layer was disposed on the front surface of the core material layer to be pressed so that the front layer went toward the core material layer. In this manner, the front layer was attached to the core material layer.

The double-coated adhesive tape was disposed on the rear surface of the core material layer to be pressed so that the double-coated adhesive tape went toward the core material layer. In this manner, the double-coated adhesive tape was attached to the core material layer, thereby forming the adhesive layer.

In this way, live reinforcement sheet including the core material layer, the front layer, and the adhesive layer was produced.

Comparative Example 1

The reinforcement sheet was produced in the same manner as that of Example 1, except that the kneading time of the resin composition in the preparation of the core material layer was changed to 30 minutes.

Comparative Example 2

The reinforcement sheet was produced in the same manner as that of Example 1, except that a foaming agent was further added in the kneading of the resin composition in the preparation of the core material layer.

Evaluation (Measurement of Area Ratio of Void in Cross Section of Cured Product of Core Material Layer)

Each of the core material layers of Examples and Comparative Examples was heated at 180° C. for 30 minutes to be completely cured. Next, the core material layer after curing was embedded in a resin for embedding (epoxy resin). Next, the core material layer that was embedded in the resin for embedding was cut by a precision cutting device so that the cross section of the core material layer was exposed. In this manner, a sample was prepared.

Next, the exposed cross section of the core material layer was polished by a mechanical polishing method.

Next, the cross-sectional image of each of the core material layers was photographed with a metal microscope.

Next, a metal microscopic image of the cross section of each of the core material layers was analyzed with an image analysis software (manufactured by National Institutes of Health, Image J) to be binarized.

Figure 7A:
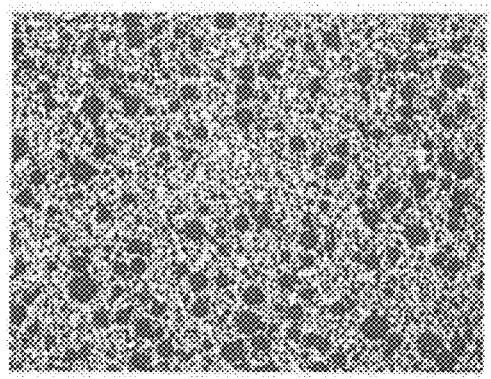
FIG. 7A shows a metal microscopic image (magnification: 50) of a cross section of a core material layer of Example 1.
Figure 7B:
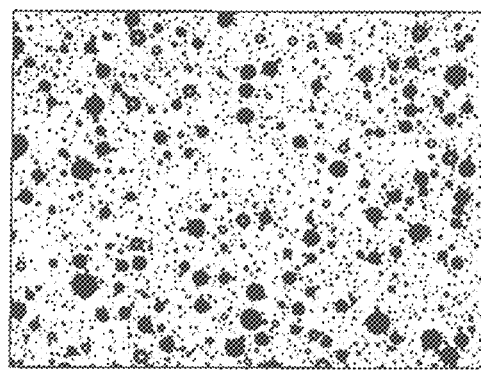
FIG. 7B shows a state of binarizing the metal microscopic image shown in FIG. 7A by an image analysis software.
Figure 7C:
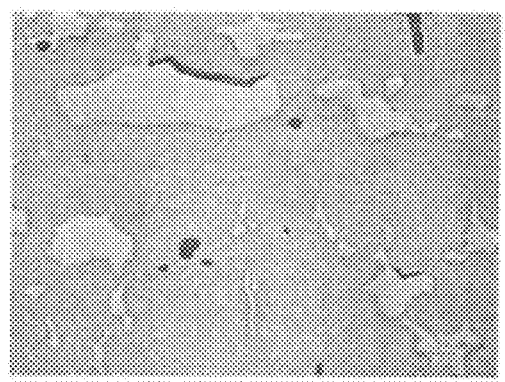
FIG. 7C shows a metal microscopic image (magnification: 50) of a cross section of a core material layer ox Example 5.
Figure 7D:
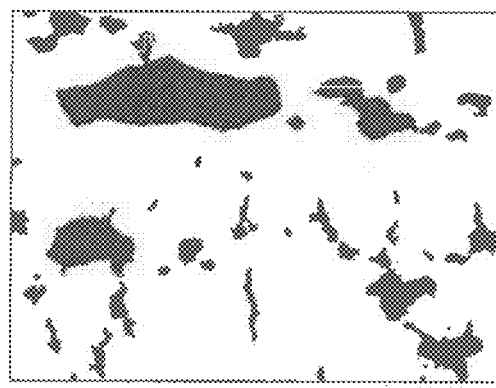
FIG. 7D shows a state of binarizing the metal microscopic image shown la FIG. 7C by an image analysis software.

A metal microscopic image (magnification: 50) of the cross section of the core material layer of Example 1 is shown in FIG. 7A, and a metal microscopic image after binarization of the cross section of the core material layer of Example 1 is shown in FIG. 7B. A metal microscopic image (magnification: 50) of the cross section of the core material layer of Example 5 is shown in FIG. 7C, and a metal microscopic image after binarization of the cross section of the core material layer of Example 5 is shown in FIG. 7D.

Figure 8A:
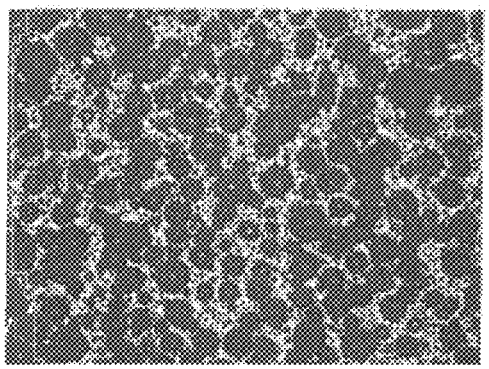
FIG. 8A shows a metal microscopic image (magnification: 50) of a cross section of a core material layer of Comparative Example 1.
Figure 8B:
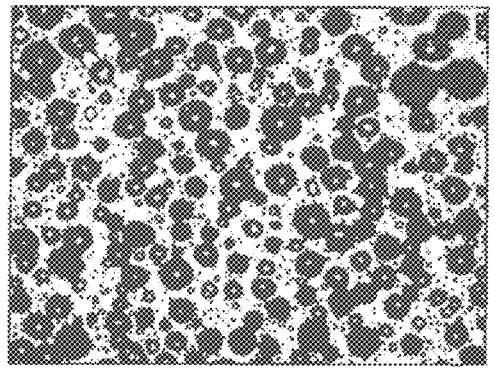
FIG. 8B shows a state of binarizing the metal microscopic image shown in FIG. 8A by an image analysis software.
Figure 8C:
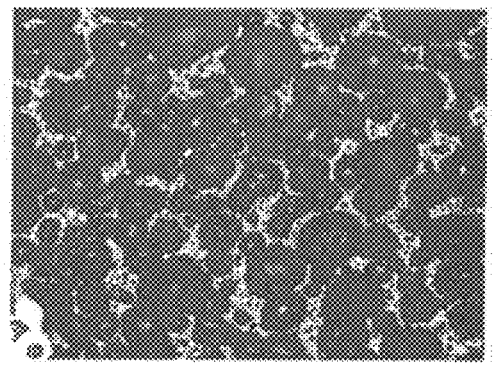
FIG. 8C shows a metal microscopic image (magnification: 50) of a cross section of a core material layer of Comparative Example 2.
Figure 8D:
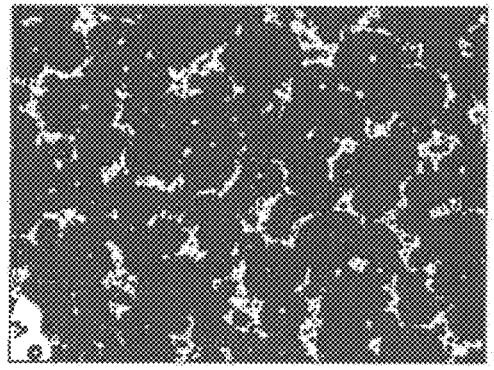
FIG. 8D shows a state of binarizing the metal microscopic image shown in FIG. 8C by an image analysis software.

A metal microscopic image (magnification: 50) of the cross section of the core material layer of Comparative Example 1 is shown in FIG. 8A, and a metal microscopic image after binarization of the cross section of the core material layer of Comparative Example 1 is shown in FIG. 8B. A metal microscopic image (magnification: 50) of the cross section of the core material layer of Comparative Example 2 is shown in FIG. 8C, and a metal microscopic image after binarization of the cross section of the core material layer of Comparative Example 2 is shown in FIG. 8D.

Next, the area ratio of the void in the cross section of the cured product of each of the core material layers was calculated from the analysis result of the metal microscopic image of the cross section of each of the core material layers. The results are shown in Table 1.

(Measurement of Number of Domain per Unit Cross-Sectional Area of Cured product of Core Material Layer, Measurement of Area Ratio of Domain and Average Size of Domain in Cross Section of Cured Product of Core Material Layer)

The sample in which the cross section of each of the core material layers of Examples and Comparative Examples was exposed was prepared in the same manner as the measurement of the area ratio of the void, and the exposed cross section of the core material layer was polished under the above-described conditions.

Next, the elastomer was dyed by osmium tetraoxide in the cross section of each of the core material layers.

Next, after the cross-sectional image of each of the core material Sayers after dying was photographed with a SEM (scanning electron microscope), the SEM image of the cross section of each of the core material layers was analyzed with the image analysis software (manufactured by National Institutes of Health, Image J) to be binarized.

In the SEM, with the observation at the magnification of 20000 (observation area: 26.56 μm$^2$) as a reference, when the number of the domain of the elastomer at the magnification of 20000 was not above 5, the magnification was reduced to 1000 (observation area: 106234 μm$^2$) to be observed.

As an observation method (observation place), the place where the area of the filler in the observation area was the minimum was selected.

Figure 9A:
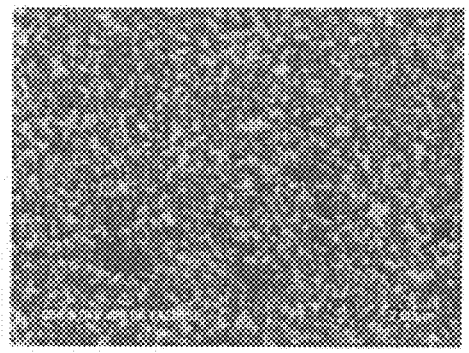
FIG. 9A shows an SEM image (magnification: 20000) of a cross section of a core material layer of Example 1.
Figure 9B:
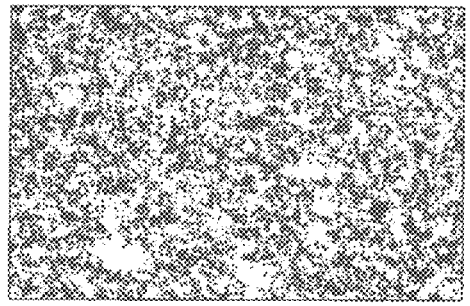
FIG. 9B shows a state of binarizing the SEM image shown in FIG 9A by an image analysts software.
Figure 9C:
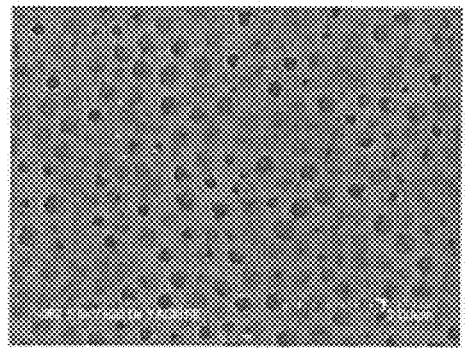
FIG. 9C shows an SEM image (magnification: 20000) of a cross section of a core material layer of Example 2.
Figure 9D:
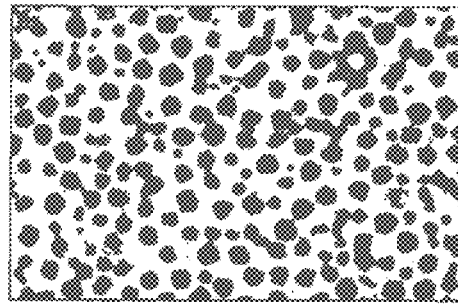
FIG. 9D shows a state of binarizing the SEM image shown in FIG. 9C by an image analysis software.

An SEM image (magnification: 20000) of the cross section of the core material layer of Example 1 is shown in FIG. 9A, and an SEM image after binarization of the cross section of the core material layer of Example 1 is shown in FIG. 9B. An SEM image (magnification: 20000) of the cross section of the core material layer of Example 2 is shown in FIG. 9C, and an SEM image after binarization of the cross section of the core material layer of Example 2 is shown in FIG. 9D.

An SEM image (magnification: 20000) of the cross section of the core material layer of Example 3 is shown in FIG.

Figure 10A:
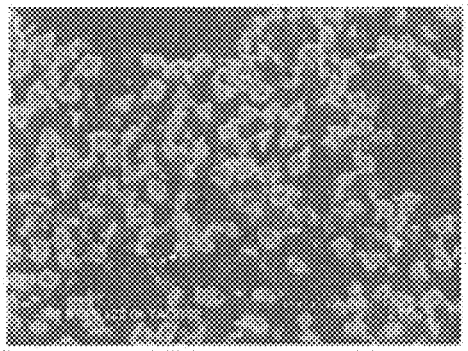
FIG. 10A shows an SEM image (magnification: 20000) of a cross section of a core material layer of Example 3.
Figure 10B:
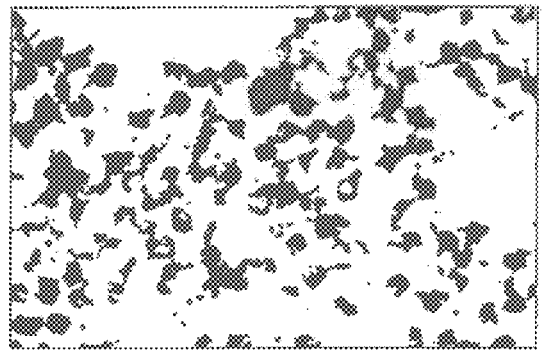
FIG. 10B shows a slate of binarizing the SEM image shown in FIG. 10A by an image analysts software.
Figure 10C:
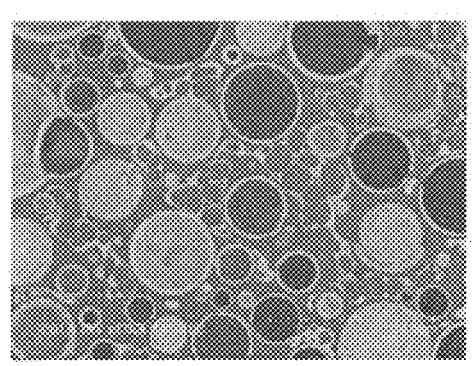
FIG. 10C shows an SEM image (magnification: 1000) of a cross section of a core material layer of Example 4.
Figure 10D:
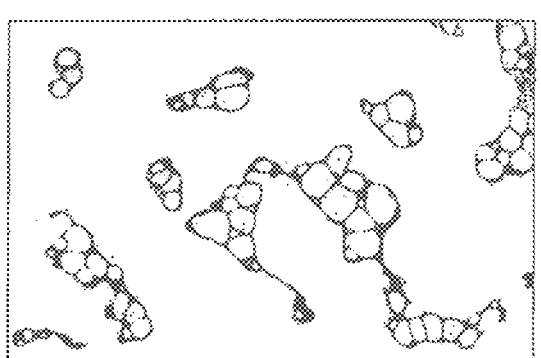
FIG. 10D shows a state of binarizing the SEM image shown in FIG. 10C by an image analysis software.
Figure 10E:
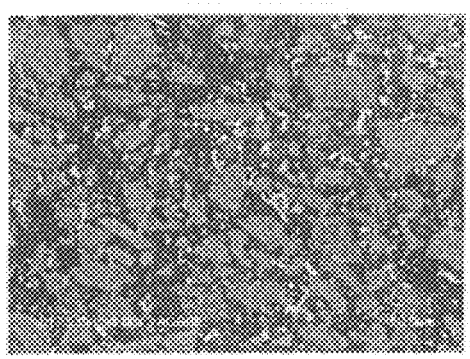
FIG. 10E shows an SEM image (magnification: 1000) of a cross section of a core material layer of Example 5.
Figure 10F:
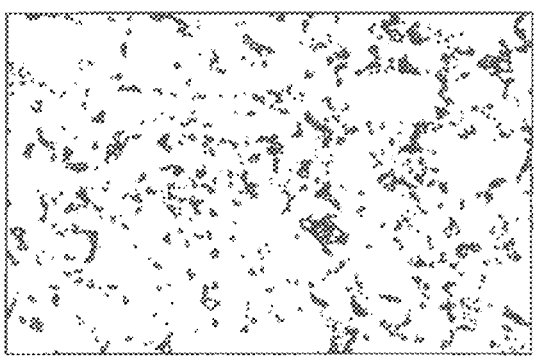
FIG. 10F shows a state of binarizing the SEM image shown in FIG. 10E by an image analysis software.

10A, and an SEM image after binarization of the cross section of the core material layer of Example 3 is shown in FIG. 10B. An SEM image (magnification: 1000) of the cross section of the core material layer of Example 4 is shown in FIG. 10C, and an SEM image after binarization of the cross section of the core material layer of Example 4 is shown in FIG. 10D. An SEM image (magnification: 1000) of the cross section of the core material layer of Example 5 is shown in FIG. 10E, and an SEM image after binarization of the cross section of the core material layer of Example 5 is shown in FIG. 10F.

Next, the area ratio of the domain and the average size of the domain (elliptic approximated long axis and elliptic approximated short axis) in the cross section of the cured product of the core material layer were calculated from the analysis result of the SEM image of the cross section of each of the core material layers. The results are shown in Table 1. In the cross section of the core material layer of Example 1. the elliptic approximation of the domain was not possible.

Also, the number of the domain per 26.56 $\mu m^2$ of the cross-sectional area of the cured product of each of the core material layers of Examples 1 to 3 was calculated from the analysis result of the SEM image (magnification: 20000) of the cross section of each of the core material layer of Examples 1 to 3. The results are shown in Table 1. In the cross section of the core material layer of Example 1, the elliptic approximation of the domain was not possible, and the calculation of the number of the domain could not be carried out.

Also, the number of the domain per 10624 $\mu m^2$ of the cross-sectional area of the cured product of each of the core material layers of Examples 4 and 5 was calculated from the analysis result of the SEM image (magnification: 1000) of the cross section of each of the core material layers of Examples 4 and 5. The results are shown in Table 1.

(Measurement of Maximum Bending Testing Force)

Each of the reinforcement sheets of Examples and Comparative Examples was cut into a rectangular shape having a width of 25 mm and a length of 150 mm.

Next, oil on the surface of the metal plate (SPCC, thickness of 0.8 mm, width of 25 mm, length of 150 mm) was removed with toluene, and thereafter, each of the reinforcement sheets was disposed on the metal plate.

Next, the metal plate on which each of the reinforcement sheets was disposed was pressed with a flat plate hot press heated at 180° C. for 150 seconds. Then, the metal plate was heated at 180° C. for 30 minutes with a hot air dryer, so that the adhesive, toe com material resin, and the front layer resin were cured. In this manner, each of the reinforcement sheets adhered to the metal plate.

Thereafter, the maximum bending testing force (the maximum value of a load in a bending test) of each of the obtained samples was measured under the following test conditions with a bending testing machine (trade name: Technograph TG-5kN (load cell: TC3D-2kN), manufactured by Minebea Co., Ltd).

Test conditions: three-point bending method, distance between supporting points=100 mm, test rate of 5 mm/min, room temperature (23° C.) and 100° C.

The bending strength at room temperature (23° C.) was evaluated based on the following criteria, and the bending strength at 100° C. was evaluated based on the following criteria.

Bad: the maximum bending testing force at room temperature (23° C.) was below 400 N Fair: the maximum bending testing force at room temperature (23° C.) was 400 N or more and below 500 N Good: the maximum bending testing force at room temperature (23° C.) was 500 N or more and below 600 N Excellent: the maximum bending testing force at room temperature (23° C.) was 600 N or more Bad: the maximum bending testing force at 100° C. was below 150 N Fair: the maximum bending testing force at 100° C. was 150 N or more and below 200 N Good: the maximum bending testing force at 100° C. was 200 N or more and below 300 N Excellent: the maximum bending testing force at 100° C. was 300 N or more The results are shown in Table 1.

The thickness (the total sum of the thickness of the metal plate, the adhesive, the core material resin, and the front layer resin) of the sample after the bending strength test at each of the temperature (23° C. and 100° C.) is shown in Table 1 as the thickness (after curing).

TABLE 1

| | | | | | No. | | | |
|---|---|---|---|---|---|---|---|---|
| | | Unit | Ex. 1 | Ex. 2 | Ex. 3 | Ex. 4 | Ex. 5 | Comp. Ex. 1 | Comp. Ex. 2 |
| Front Layer | Fiber | — | CFUD | CFUD | CFUD | CFUD | CFUD | CFUD | CFUD |
| | Epoxy Resin | mass % | 33 | 33 | 33 | 33 | 33 | 33 | 33 |
| | Number of Unidirectional Fiber Resin Composite Sheet | — | 4 | 4 | 4 | 4 | 4 | 4 | 4 |
| | Thickness | mm | 0.40 | 0.40 | 0.40 | 0.40 | 0.40 | 0.40 | 0.40 |
| Core Material Layer | Formulation Matrix Resin Unmodified Epoxy Resin jER 828 | parts by mass | 40 | 100 | — | — | 40 | 40 | 40 |
| | jER 834 | | — | — | 80.8 | 80.8 | — | — | — |
| | Elastomer Rubber-Modified Epoxy Resin EPR 2000 | | — | — | — | — | 23 | — | — |
| | Hypox RA840 | | 60 | — | — | — | 37 | 60 | 60 |
| | Hypox RA841 | | — | 25 | — | — | — | — | — |
| | Core-Shell-Type Rubber Particles ZEFIAC F3S1 | | — | — | 19.2 | 9.6 | — | — | — |
| | METABLEN C223A | | — | — | — | 9.6 | — | — | — |
| | Rubber Tufdene 2003 | | — | — | — | — | — | — | — |
| | Krynac 3345F | | — | — | — | — | — | — | — |
| | Filler CaCO₃ S-60HS | parts by mass | 70.7 | 70.7 | 87.0 | 70.7 | 32.1 | 70.7 | 70.7 |
| | Hollow Glass | mass % | 40% | 35% | 39% | 40% | 75% | 40% | 40% |
| | CaCO₃ or Hollow Glass DCMU-99 | parts by mass | 2 | 2 | 2 | 2 | 2 | 2 | 2 |
| | Latent Curing Agent DDA-80 | | 5 | 5 | 5 | 5 | 5 | 5 | 5 |
| | Foaming Agent NT-N | | — | — | — | — | — | — | 1.1 |
| | Young's Modulus | MPa | 1,529 | 1,206 | 1,285 | 1,394 | 2,554 | 1,442 | 907 |
| | Area Ratio of Void | % | 17% | 5% | 42% | 9% | 17% | 51% | 89% |
| | Number of Domain/Unit Cross-Sectional Area | piece/μm² | — | 1.98/26.56 | 1.34/26.56 | 7/10624 | 539/10624 | — | — |
| | Area Ratio of Domain | % | 27% | 39% | 21% | 6% | 8% | — | — |
| | Size of Domain Elliptic Approximated Long Axis | μm | — | 0.26 | 0.25 | 23 | 1.5 | — | — |
| | Elliptic Approximated Short Axis | μm | — | 0.21 | 0.18 | 10 | 0.8 | — | — |
| Adhesive Layer | Thickness (before Curing) | mm | 3.5 | 3.5 | 3.5 | 3.5 | 3.5 | 3.5 | 3.0 |
| | Thickness | mm | 0.2 | 0.2 | 0.2 | 0.2 | 0.2 | 0.2 | 0.2 |
| Metal Plate | Thickness | mm | 0.8 | 0.8 | 0.8 | 0.8 | 03.8 | 0.8 | 0.8 |
| Evaluation | Bending Test (Measurement at Normal Temperature) Maximum Value | N | 844 | 487 | 469 | 418 | 764 | 308 | 160 |
| | Fracture Made | — | Excellent | Fair | Fair | Fair | Excellent | Bad | Bad |
| | Evaluation | — | 4.02 | 4.61 | 4.64 | 4.4 | 4.84 | 4.822 | 4.64 |
| | Thickness (after Curing) | mm | 367 | 343 | 286 | 215 | 504 | 86 | 54 |
| | Bending Test (Measurement at 100° C.) Maximum Value | N | | No Fracture (Plastic Deformation) | Fracture of Front Layer | Fracture of Front Layer | | Compression Fracture of Core Material | |
| | Fracture Mode | — | Excellent | Excellent | Good | Good | Excellent | Bad | Bad |
| | Evaluation Thickness (after Curing) | mm | 4.5 | 4.69 | 4.76 | 4.57 | 4.78 | 4.69 | 4.45 |

The details of the abbreviations described in Table 1 are given in the following.

JER 828: unmodified epoxy resin, uncured state, epoxy equivalent of 184 g/eq. to 194 g/eq., manufactured by Mitsubishi Chemical Corporation JER 834: unmodified epoxy resin, uncured state, epoxy equivalent of 230 g/eq. to 270 g/eq., manufactured by Mitsubishi Chemical Corporation EPR 2000: CTBN-modified epoxy resin, uncured state, epoxy equivalent of 215 g/eq., manufactured by ADEKA CORPORATION HypoxRA840: CTBN-modified epoxy resin, uncured state, epoxy equivalent of 350 g/eq., manufactured by CVC Specialty Chemicals Inc.

HypoxRK84L: CTBN-modified epoxy resin, uncured state, epoxy equivalent of 1200 to 1800 g/eq., manufactured by CVC Specialty Chemicals Inc.

ZEFIAC F351: core-shell-type rubber particles (core portion: NBR, shell portion: acrylic polymer), manufactured by Aica Kogyo Co., Ltd.

METABLEN C223A: core-shell-type rubber particles (core portion: MBS, shell portion: acrylic polymer), manufactured by Mitsubishi Chemical Corporation Tufdene 2003: rubber, Mooney viscosity (ML1+4, at 100° C.) of 33, balo-shape, manufactured by Asahi Kasei Corporation Krynac 3345F: rubber, Mooney viscosity (ML1+4, at 100° C.) of 45±5, bale-shape, manufactured by LANXESS $CaCO_3$: heavy calcium carbonate, true density of 2.7 g/cm$^3$, MARUO CALCIUM CO., LTD.

S-60HS: hollow glass, average particle size of 30 μm, true density of 0.6 g/cm$^3$, manufactured by 3M Japan Limited DCMU-99: urea compound, 3-(3,4-dichlorophenyl)-1,1-dimethylurea, manufactured by Hodogaya Chemical Co., Ltd.

DDA-50: dicyandiamide, manufactured by CVC Specialty Chemicals Inc.

NT-N: manufactured by EIWA CHEMICAL IND. CO., LTD.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The reinforcement sheet and the reinforcement kit of the present invention can be applied for reinforcement of a metal plate used in various industrial products, and can be, for example, preferably used for reinforcement of a metal plate used in transportation machines, a metal plate used in household electric appliances, or the like. The reinforcement member of the present invention can be applied for various industrial products, and can be, for example, preferably used for transportation machines, household electric appliances, or the like.

DESCRIPTION OF REFERENCE NUMERALS

1 Reinforcement sheet
2 ore material layer
3 Front layer
4 Adhesive layer
6 Metal plate
7 Reinforcement sheet
8 Reinforcement kit
10 Reinforcement member
11 Reinforcement member
20 Filler
21 Core material resin
22 Matrix resin
23 Domain
24 Void
30 Unidirectional fiber resin composite sheet

The invention claimed is:

1. A reinforcement sheet for reinforcing a metal plate by adhering to the metal plate, comprising:
    a core material layer containing a resin and a filler; and
    a front layer disposed at one side in a thickness direction of the core material layer, wherein
    the front layer is obtained by laminating a plurality of unidirectional fiber resin composite sheets,
    the filler includes at least one of calcium carbonate and a hollow glass,
    a content ratio of the filler in the core material layer is 15 mass % or more and below 85 mass %,
    the core material layer has a thickness of 1 mm or more, and
    an area ratio of a void in a cross section of a solidified material of the core material layer is 50% or less.

2. The reinforcement sheet according to claim 1, wherein the resin contains a matrix resin and an elastomer forming a two-phase structure dispersed in the matrix resin, and
    an area ratio of a domain consisting of the elastomer in the cross section of the solidified material of the core material layer is 40% or less.

3. The reinforcement sheet according to claim 1, wherein the resin contains a matrix resin and an elastomer forming a two-phase structure dispersed in the matrix resin, and
    an area ratio of a domain consisting of the elastomer in the cross section of the solidified material of the core material layer is 30% or less.

4. The reinforcement sheet according to claim 2, wherein the number of the domain per 10624 μm$^2$ of the cross-sectional area of the solidified material of the core material layer is 5 or more.

5. The reinforcement sheet according to claim 2, wherein the number of the domain per 26.56 μm$^2$ of the cross-sectional area of the solidified material of the core material layer is 5 or more.

6. The reinforcement sheet according to claim 2, wherein the matrix resin contains an unmodified epoxy resin, and the elastomer contains a rubber-modified epoxy resin.

7. The reinforcement sheet according to claim 1 further comprising:
    an adhesive layer disposed at the other side in the thickness direction of the core material layer.

8. The reinforcement sheet according to claim 1, wherein each of the plurality of unidirectional fiber resin composite sheets contains a carbon fiber or a glass fiber, and a thermosetting resin.

9. A reinforcement member comprising:
    the reinforcement sheet according to claim 1, and
    a metal plate reinforced by the reinforcement sheet.

10. The reinforcement sheet according to claim 1, wherein the plurality of unidirectional fiber resin composite sheets are laminated in the thickness direction,
    each of the plurality of unidirectional fiber resin composite sheets contains a plurality of fibers, each of the plurality of fibers in a first unidirectional fiber resin composite sheet extends in a first fiber direction that is the same direction perpendicular to the thickness direction, wherein a plurality of fibers in a second unidirectional fiber resin composite sheet are arranged in a direction perpendicular to the first fiber direction, and the fiber directions of the unidirectional fiber resin composite sheets that are next to each other cross each other.

* * * * *